United States Patent [19]

Kumamura et al.

[11] Patent Number: 5,102,587
[45] Date of Patent: Apr. 7, 1992

[54] INJECTION MOLD USING SCREW THRUST CONTROL

[75] Inventors: Masaaki Kumamura, Yokohama; Ryohei Inaba, Kawasaki; Yozo Tobo, Sagamihara; Hirofumi Sugawara, Yokohama; Tadanobu Miyazaki, Ushiku, all of Japan

[73] Assignee: Canon Kabushiki Kaisha, Tokyo, Japan

[21] Appl. No.: 556,456

[22] Filed: Jul. 24, 1990

[51] Int. Cl.⁵ ............................................. B29C 45/77
[52] U.S. Cl. ................................... 264/40.1; 264/40.5; 425/145
[58] Field of Search ................ 264/40.1, 40.3, 40.5, 264/328.1; 425/135, 145, 149, 166

[56] References Cited

U.S. PATENT DOCUMENTS

| | | | |
|---|---|---|---|
| 4,758,391 | 7/1988 | Shimizu et al. | 264/40.1 |
| 4,832,883 | 5/1989 | Kato et al. | 264/40.1 |
| 4,851,170 | 7/1989 | Shimizu et al. | 425/189 |
| 4,961,696 | 10/1990 | Yamamura | 264/40.1 |

Primary Examiner—Jill L. Heitbrink
Attorney, Agent, or Firm—Fitzpatrick, Cella, Harper & Scinto

[57] ABSTRACT

An injection molding apparatus includes an electrically driven injection apparatus in which a screw accommodated in a heating cylinder is driven by a motor. The injection apparatus includes a pressure detection device for detecting an injection pressure of the screw and a device for detecting a stroke of the screw. Speed control is first conducted until the preset packing rate which represents that a dwell process is almost started is obtained, and the remaining injection process and the dwell process are conducted using an output of the pressure detection device. If a volume of resin in the cylinder which is required to fill the cavity is obtained beforehand, a packing rate of the molding material in the cavity is obtained by detecting the screw stroke. A packing rate which represents that the dwell process is nearly started is preset, and speed control of the screw is conducted and the resin is thereby packed at a fixed injection rate until when that preset packing rate is obtained. In the remaining injection process and the subsequent dwell process, a desired screw thrust is obtained using the output of the pressure detection device which detects the injection pressure of the screw.

2 Claims, 16 Drawing Sheets

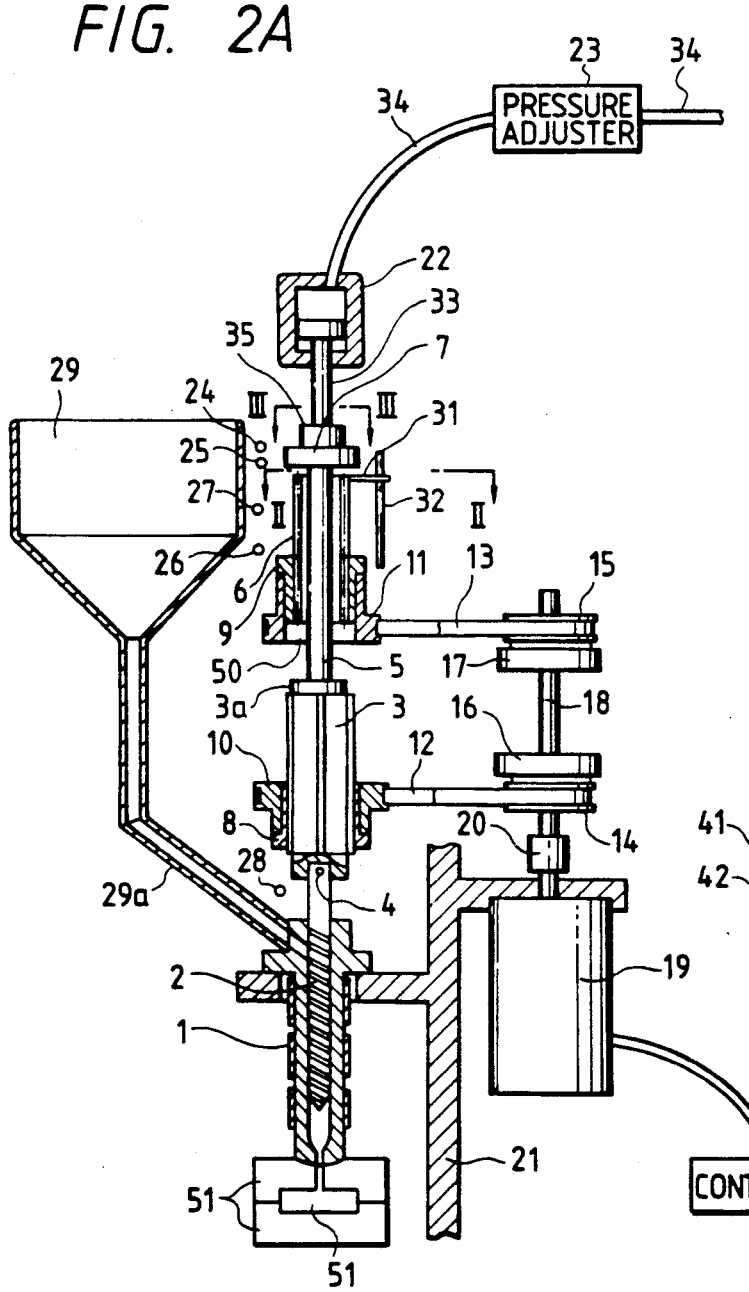
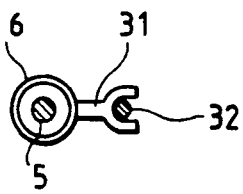
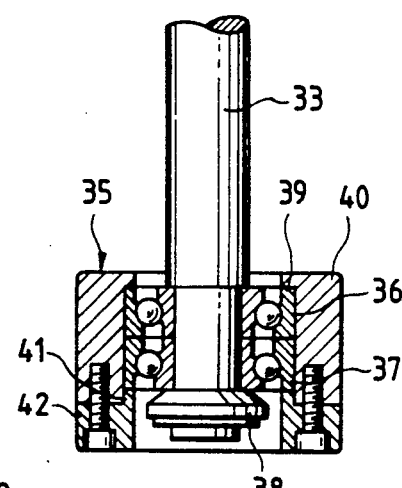
FIG. 2A
FIG. 2B
FIG. 2C

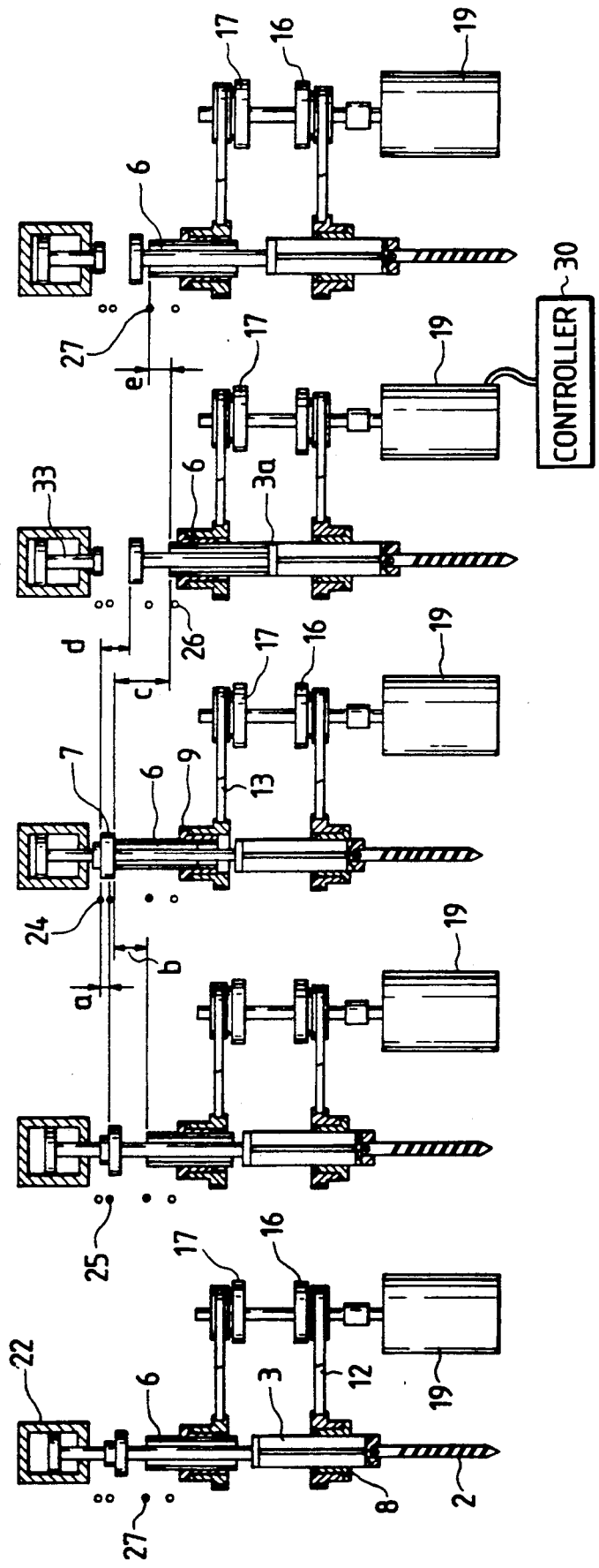

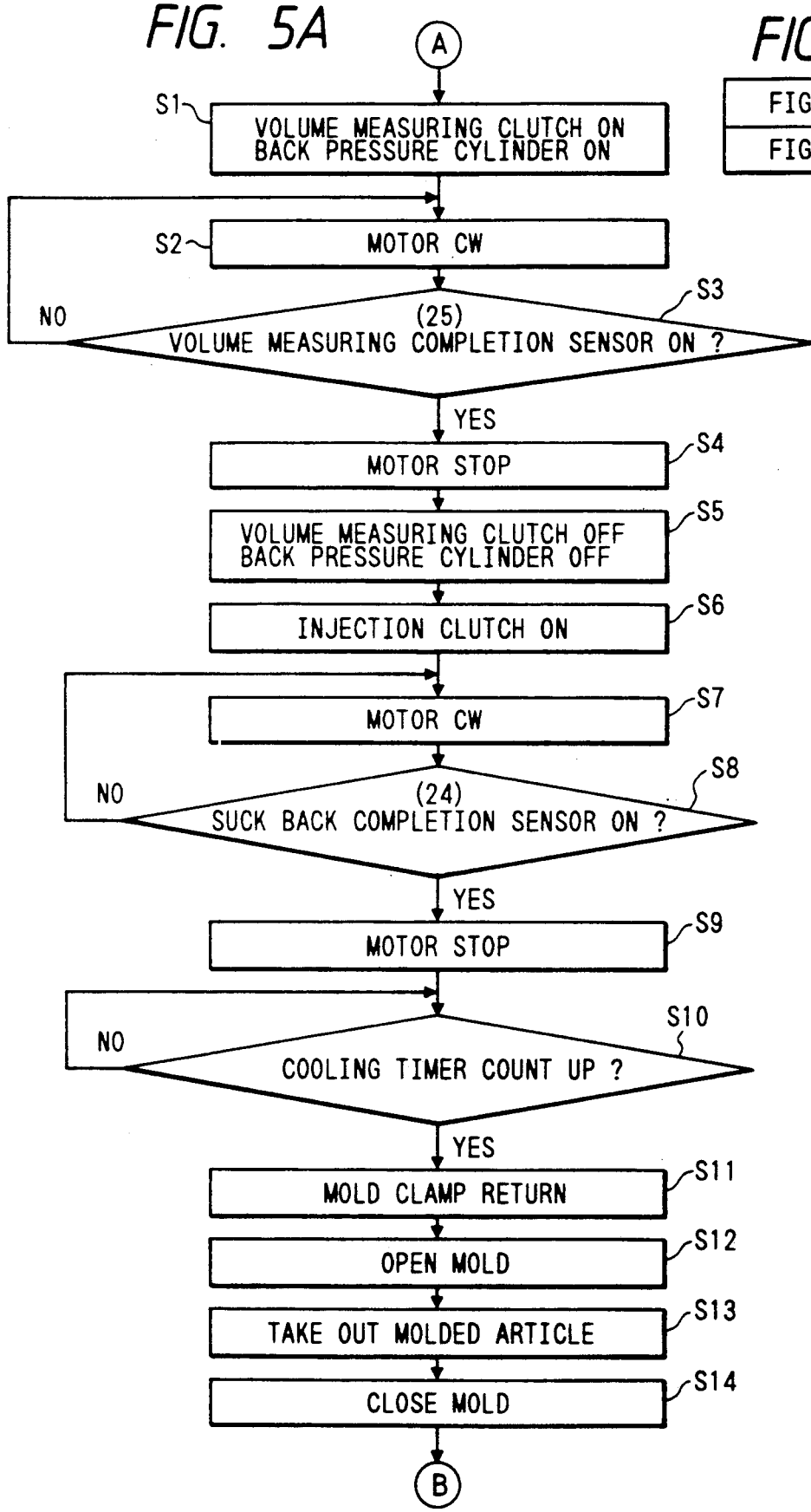

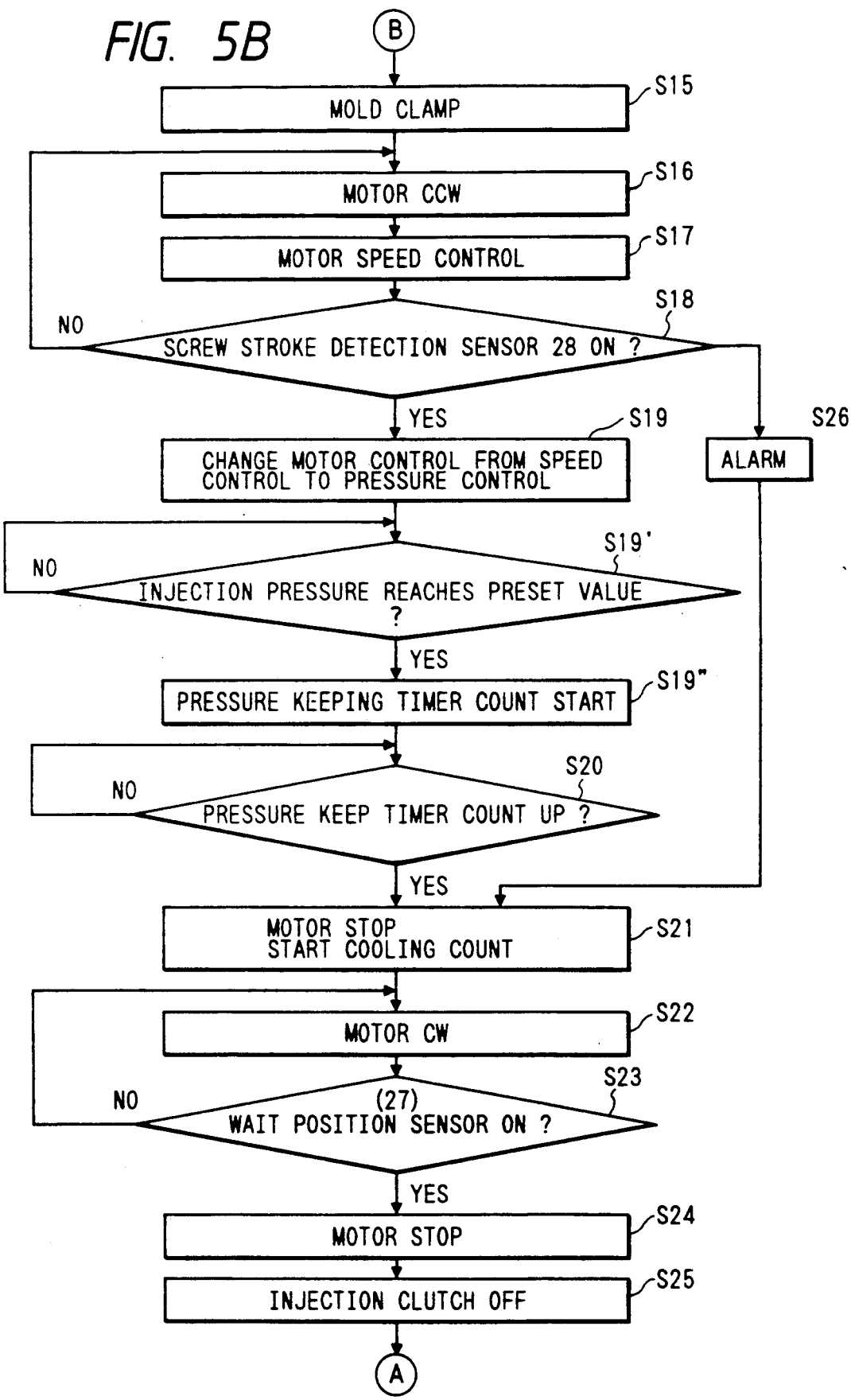

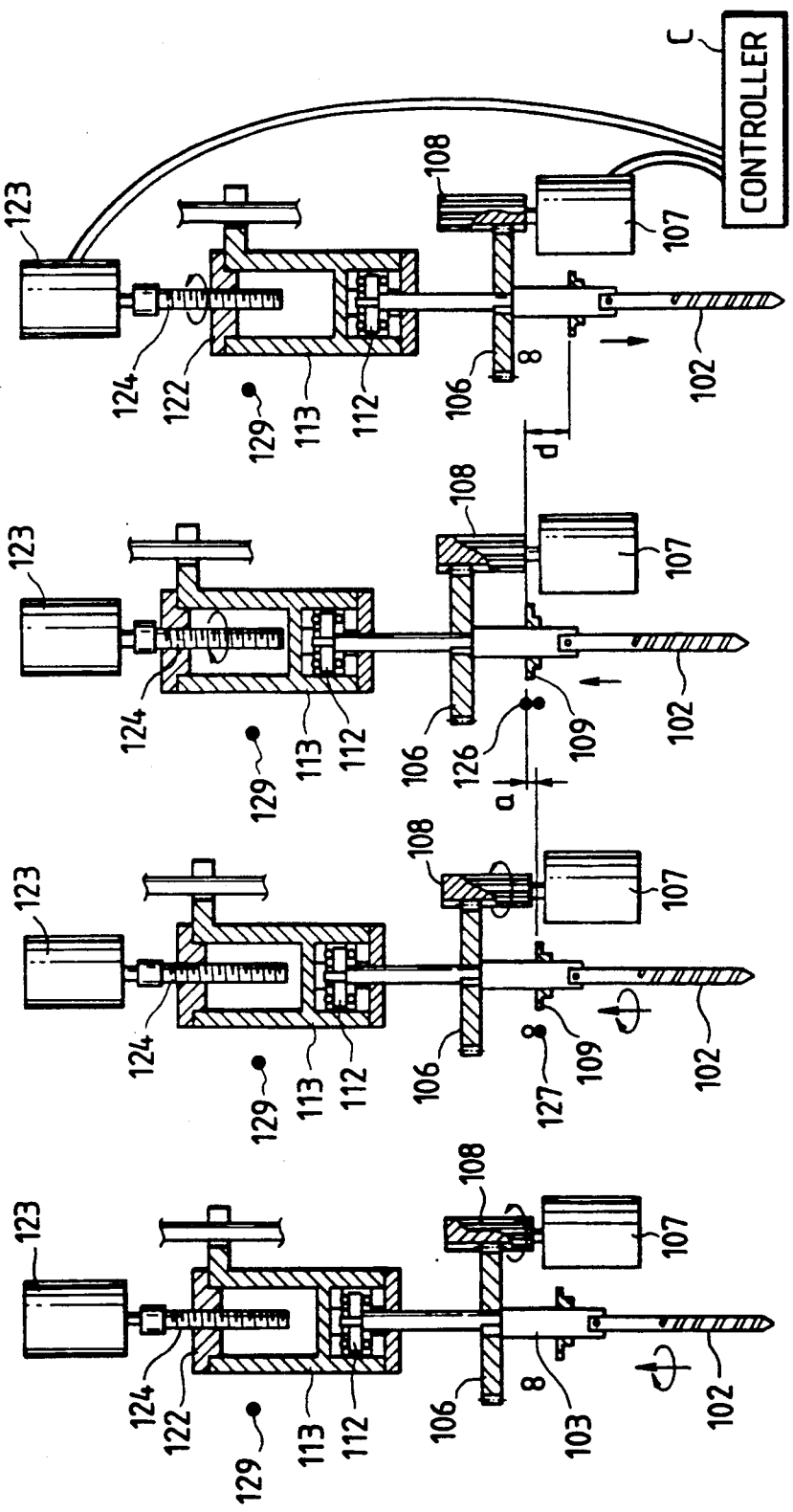

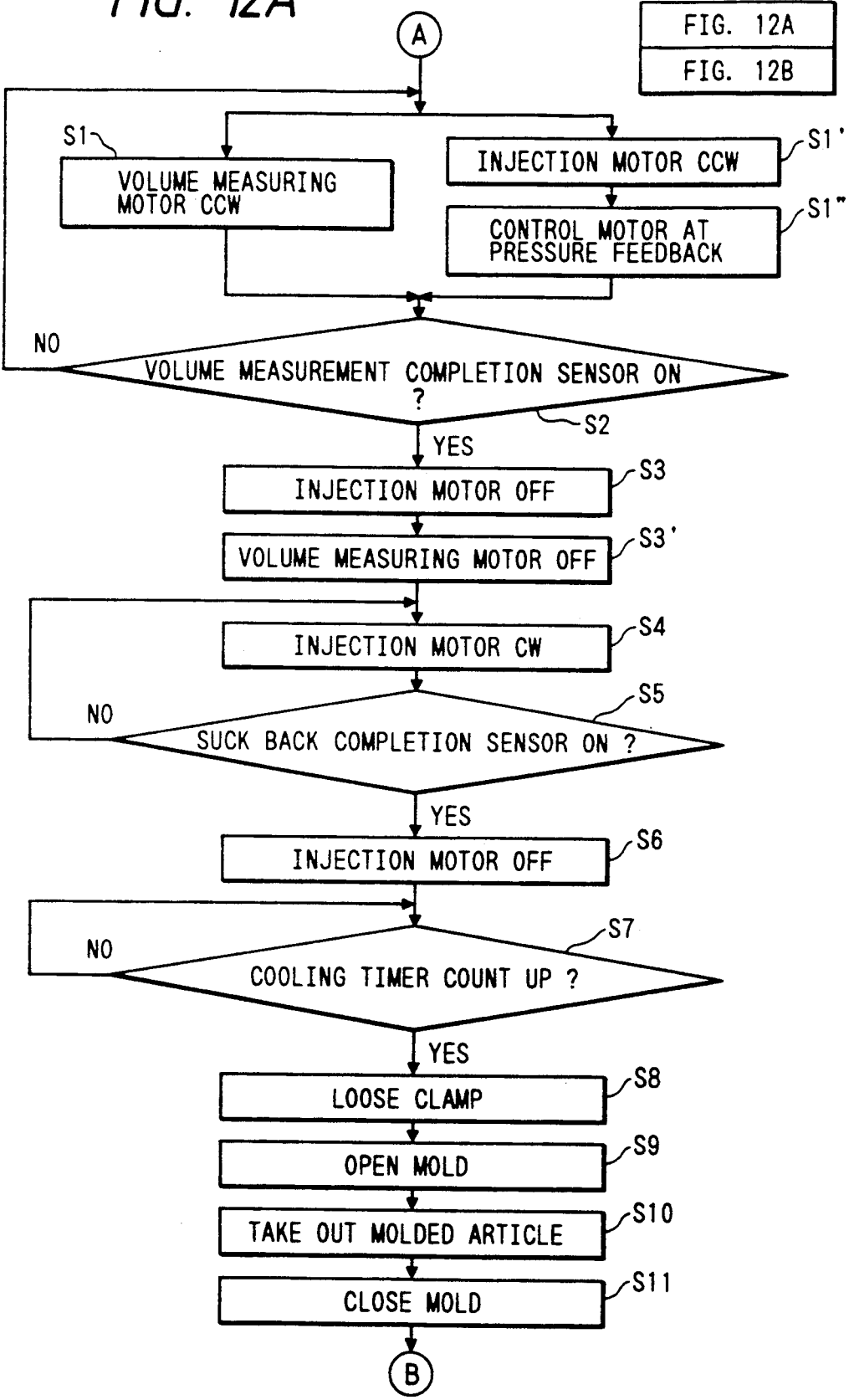

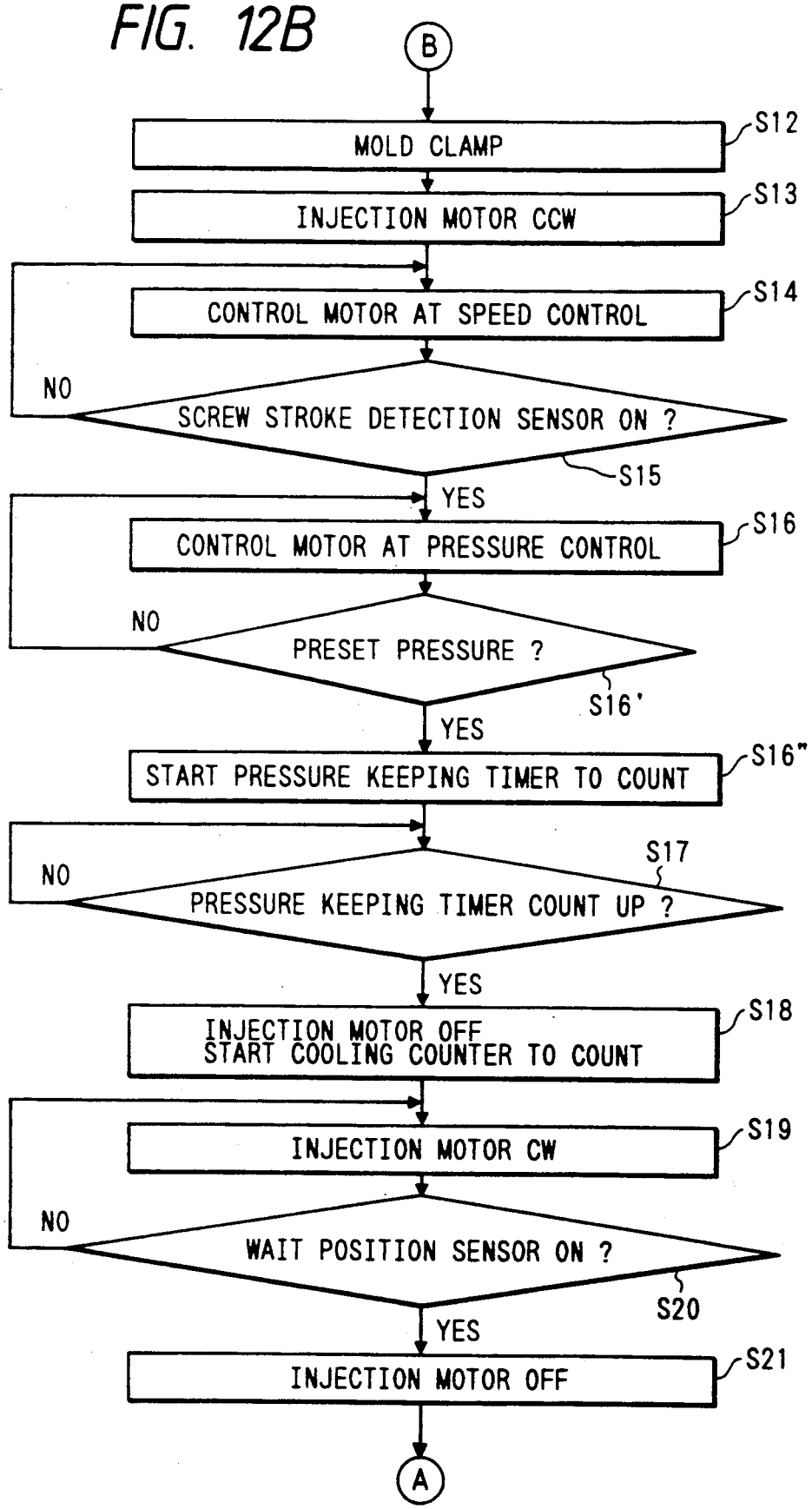

INJECTION MOLD USING SCREW THRUST CONTROL

BACKGROUND OF THE INVENTION

1. Field of the Invention

The present invention relates to a method of controlling the thrust of a screw of an injection molding apparatus of the type in which the screw is driven by a motor, and more particularly, to a screw thrust controlling method which is suitable for use in production of molded articles, in particular, thin molded articles.

2. Related Background Art

In the injection molding in which molded articles are manufactured by injecting a resin material such as a plastic into a mold, hydraulic type injection molding apparatuses have been employed. However, electrically driven injection molding apparatuses have been developed in recent years.

In this electrically driven injection molding apparatus, a screw is rotated by a motor, and control of the thrust of the screw is conducted by applying a current corresponding to a torque which is preset on the basis of the relation between the current of the motor and the torque thereof which is obtained beforehand.

However, since the relation between the current and the torque varies depending on the situation in which the motor is used, the above-described control method has a disadvantage in that an actually obtained screw thrust is altered from a desired screw thrust so that accurate thrust control is thus impossible. This results in generation of variations in the dimensions or strength of molded articles during the injection or dwell process, and makes mass production of uniform molded articles very difficult.

This problem of the conventional techniques has been solved by Japanese Patent Laid-Open No. 44417/1987.

In this technique, as shown in FIG. 14, a screw 71 is coupled through a load sensor 72 to a ball bearing screw 73 which is moved back and forth by the rotation of a nut 74. The nut 74 is rotated by a motor 78 whose rotational force is transmitted to the nut 74 on a route consisting of a driving gear 77, a transmitting shaft 76, and a driving gear 75. A comparator Y2 compares a thrust signal S1 which is taken out from the load sensor 72 with a signal S2 which represents a preset value of the screw thrust and which is output from a presetter Y1, and outputs a resultant instruction S to a motor controller Y3. The controller Y3 supplies a current i to the motor 78 to drive it and thereby makes the motor torque, i.e., the screw thrust, follow the preset value with a high degree of accuracy. Thus, an actual screw thrust is detected by a sensor for detecting the screw load during the injection and dwell processes, and the current value applied to the motor is controlled such that the detected screw thrust coincides with the preset value so as to produce uniform molded articles in which there exists no variation in the dimensions or strength during the injection or dwell process and to obtain accurately controlled back pressure during the plasticization process.

In the above-described injection molding apparatus, the molding material must be charged into a cavity at a fixed injection rate throughout the injection process so as to achieve tight packing of the molding material. In the case of production of thin molded articles, it is particularly difficult for the molding resin to be packed into every corner of the mold, and injection may be completed before the cavity is filled with the molding resin, generating sink or defective shape in the obtained molded articles. To obtain a fixed injection rate during the injection process is therefore essential, and this may be achieved by controlling the speed of the screw. However, in the above-described screw thrust control method in which the actual thrust of the screw is detected by the screw load sensor and the detected thrust is made coincided with the preset value throughout the injection process, screw speed is an unknown factor and it is therefore impossible to obtain a fixed injection rate.

SUMMARY OF THE INVENTION

The present invention is directed to eliminating the above-described problem of the prior techniques, and has an object of providing a screw thrust control method for use in an injection molding apparatus in which a desired screw thrust is obtained during a dwell process while a fixed injection rate is obtained during an injection process by conducting a screw speed control, which thus allows a molding resin to be filled in every corner of a cavity even when thin molded articles are to be produced, and which thus enables molded articles having no sink and no defect in shape to be manufactured.

To this end, the present invention provides a screw thrust control method for use in an injection molding apparatus which is an electrically driven injection apparatus in which a screw accommodated in a heating cylinder is driven by a motor. The injection apparatus includes a pressure detection means for detecting an injection pressure of the screw and a device for detecting a stroke of the screw. Speed control is first conducted until a packing rate which represents that a dwell process is almost started is obtained, and the remaining injection process and the dwell process are conducted using an output of the pressure detection device.

In the preferred embodiment of the present invention, when control of the motor which drives the screw is switched over from the speed control to the pressure control, a detection means for detecting a stroke (movement) of the screw is provided, and a packing rate of the resin in the cavity is detected by using a signal from the detection means.

In another preferred embodiment of the present invention, a means for detecting a pressure for the pressure control is disposed in series with and between the straight line motion mechanism and the rotation mechanism of the screw in order to detect the pressure applied to the screw with a high degree of accuracy.

In another preferred embodiment of the present invention, the straight line motion mechanism includes a ball nut and a hollow ball bearing screw. A pressure sensor which constitutes the pressure detecting means is directly engaged with the hollow ball bearing screw in order to detect the pressure applied to the screw with a high degree of accuracy and to drive the screw accurately.

Another object of the present invention is to provide a back pressure adjusting method for an injection molding apparatus which is capable of adjusting the back pressure during a volume measurement and mixture process with a high degree of accuracy by using a pressure sensor.

BRIEF DESCRIPTION OF THE DRAWINGS

FIG. 2A is a schematic cross-sectional view of the first embodiment of the present invention;

FIG. 2B is a section taken along the line II—II of FIG. 2A;

FIG. 2C is a section taken along the line III—III of FIG. 2A;

FIGS. 3A to 3E explain the operation of the first embodiment of the present invention;

FIG. 5, 5A and 5B are a flowchart of the injection molding operation of the first embodiment of the present invention;

FIGS. 11A to 11D explain the operation of the second embodiment of the present invention;

FIG. 12, 12A and 12B are a flowchart of the injection molding operation of the second embodiment of the present invention;

DETAILED DESCRIPTION OF THE PREFERRED EMBODIMENTS

A first embodiment of the present invention will be described first with reference to FIGS. 1 to 5.

Figure 1:
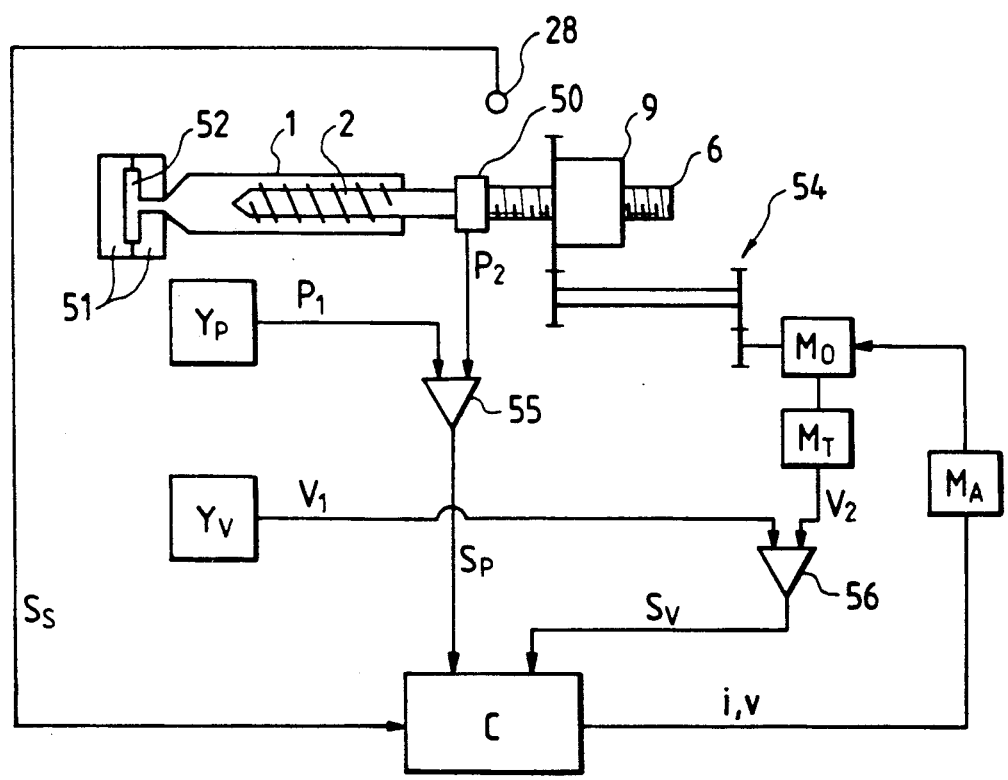
FIG. 1 is a schematic view of a first embodiment of the present invention.

Referring first to FIG. 1 which is a schematic view of an injection molding apparatus according to the present invention, a ball bearing screw 6 is provided at the rear of a screw 2 accommodated in a heating cylinder 1 through a pressure sensor 50 for detecting a pressure under which the screw is injected. The ball bearing screw 6 is moved back and forth by the rotation of a ball nut 9. The ball nut 9 is rotated by a motor M0 whose rotational force is transmitted to the ball nut 9 through a straight line motion mechanism 54 which converts the rotational force of the motor M0 into a straight line motion of the screw 2. Molds 51 having a cavity 52 are pressed against the distal end of the cylinder 1.

A pressure value P1 which is preset in a pressure setting means YP beforehand is sent to a pressure comparison means 55 where it is compared with a screw injection pressure P2 detected by the pressure sensor 50, and an instruction SP corresponding to the comparison results is input to a motor control unit C.

A speed V1 which is preset in a speed setting means YV beforehand is sent to a speed comparison means 56 where it is compared with a motor rotational speed V2 detected by a tacho generator MT, and an instruction SV corresponding to the comparison results is input to the motor control unit C.

That is, if it is compared by the comparison means 56 that the output V2 from the tacho generator MT is smaller than the set value V1, the control unit C gives an instruction to an amplifier MA and thereby makes it flow a larger current. This increases the velocity at which the motor M0 is driven. In a case where the output of the tacho generator MT is larger than the set value V1, the current applied to the motor is reduced by a circuit which consists of the comparison means 56, the control unit C, the amplifier MA and the motor M0.

The screw 2 stroke detecting signal Ss is detected by a screw stroke detecting sensor 28 provided on the side of the ball bearing screw. The detected signal Ss is sent to the motor control unit C. The molding material located in front of the screw 2 is packed into the cavity 52 as the screw 2 is driven by the motor M0 and thereby advances, during which the screw stroke detection signal Ss is input to the control unit C. Upon receipt of the signal Ss, the motor control unit C makes a determination as to whether the control performed in the unit C is based on the signal sent from the speed comparison means 56 or the signal sent from the pressure comparison means 55, and sends a current i resulting from the determination to the motor M0 through the motor amplifier MA.

The packing rate may be set on the basis of the relation between the stroke S0 of the screw 2 which is required to fill the cavity 52 and which is measured beforehand and the actual stroke S1 of the screw 2. For example, if it is desired to detect the time when the molding material has been packed at a packing rate of 90%, the screw stroke detection sensor 28 is provided at a position where it outputs a signal Ss when the screw 2 has moved to the position corresponding to 90% ($S1 = 0.9 \times S0$) of the previously obtained stroke S0 thereof. The detection signal Ss is used to determine as to whether or not the cavity 52 has been filled with the molding material at a packing rate of 90%. During the injection process, the voltage v, which is sent from the motor control unit C to the motor 19, is controlled on the basis of the instruction SV sent from the speed comparison means 56 such that the motor rotational speed V2 coincides with the preset speed V1. When the sensor 28 outputs the detection signal Ss, i.e., when the packing rate reaches 90%, control of the motor is switched over from the speed control to the pressure control. Thereafter, the current i, which is sent from the motor control unit C to the motor 19, is controlled on the basis of the instruction SP sent from the pressure comparison means 55 such that the injection pressure P2 coincides with the preset pressure P1, and the remaining packing and dwell are then conducted on the basis of that current i.

In the above-described motor controlling method, since a fixed injection rate is achieved by the speed control which is conducted until the preset packing rate of the cavity 52 is obtained, even if the cavity is thin, it is possible to fill the molding material in every corner of the cavity and thereby produce molded articles which has no sink marks nor defect in shape. During the remaining injection process and the subsequent dwell process, pressure control is conducted and a desired pressure is thereby obtained. This enables uniform molded articles to be manufactured. The packing rate at which the control is switched over from the speed control to the pressure control can be altered by moving the position of the sensor 28 accordingly.

Next, the concrete example of an electrically driven type injecting apparatus which employs the above-described screw thrust control means will be described with reference to FIGS. 2 and 3. In FIGS. 2 and 3, the same reference numerals are used to denote parts which are the same as those in FIG. 1

This electrically driven injection apparatus includes the screw 2 accommodated in the heating cylinder 1, a spline shaft 3 fixed to the screw 2 by means of a pin 4, a hollow ball bearing screw guide shaft 5 coupled to the upper end of the spline shaft 3 by means of a bolt or the like (not shown), the ball bearing screw guide shaft 5 having a stopper plate 7 fixed to its upper end, a hollow ball bearing screw 6 fitted on the ball bearing screw guide shaft 5 in such a manner as to be slidable therealong, and a cylinder rod 33 provided above the guide shaft 5 in such a manner that a thrust bearing 35 provided at the lower end thereof abuts against the stopper plate 7. The screw 2, the spline shaft 3, the hollow ball bearing screw guide shaft 5, the hollow ball bearing screw 6 and the cylinder rod 33 are vertically disposed on a straight line.

A hopper 29 for supplying the molding material into the heating cylinder 1 is connected to the heating cylinder 1 by way of a pipe 29a.

An electrically driven motor 19, which is controlled by a control unit 30, is disposed parallel to the above-described components. The motor 19 is fixed to an injection unit base 21 in which the heating cylinder 1 is retained. An input shaft 18 is coupled to the electrically driven motor 19 through a joint sleeve 20. To this input shaft 18 is fixed two clutches 16 and 17 (the clutch 16 being called a volume measurement and mixture clutch, and the clutch 17 being called an injection clutch). The volume measurement and mixture clutch 16 can be connected to an input timing pulley 14, which is in turn coupled through a timing belt 12 to an output timing pulley 10 fixed to the outer periphery of a spline nut 8 fitted on the spline shaft 3. Thus, when the clutch 16 is connected to the pulley 14, the rotational force of the electrically driven motor 19 is transmitted through the pulley 14, the timing belt 12, the timing pulley 10 and the spline nut 8 to the spline shaft 3, thereby rotating the spline shaft 3 and, hence, the screw 2. The clutch 17 can be connected to an input timing pulley 15, which is in turn connected through a timing belt 13 to an output timing pulley 11 fixed to the ball nut 9. Thus, when the clutch 17 is connected to the pulley 15, the rotational force of the electrically driven motor 19 is transmitted through the pulley 15, the timing belt 13 and the timing pulley 11 to the ball nut 9, thereby rotating it and thus moving the hollow ball bearing screw 6 up and down.

A protrusion 31 having a cross-sectional form shown in FIG. 2B is provided on the hollow ball bearing screw 6. The protrusion 31 has bifurcated distal ends, and a guide rod 32 (not shown) fixed to the injection unit base 21 is fitted into the bifurcated distal ends, by which the hollow ball bearing screw 6 can be moved on a straight line with respect to the guide shaft 5 without being rotated as the ball nut 9 is rotated.

Figure 4:
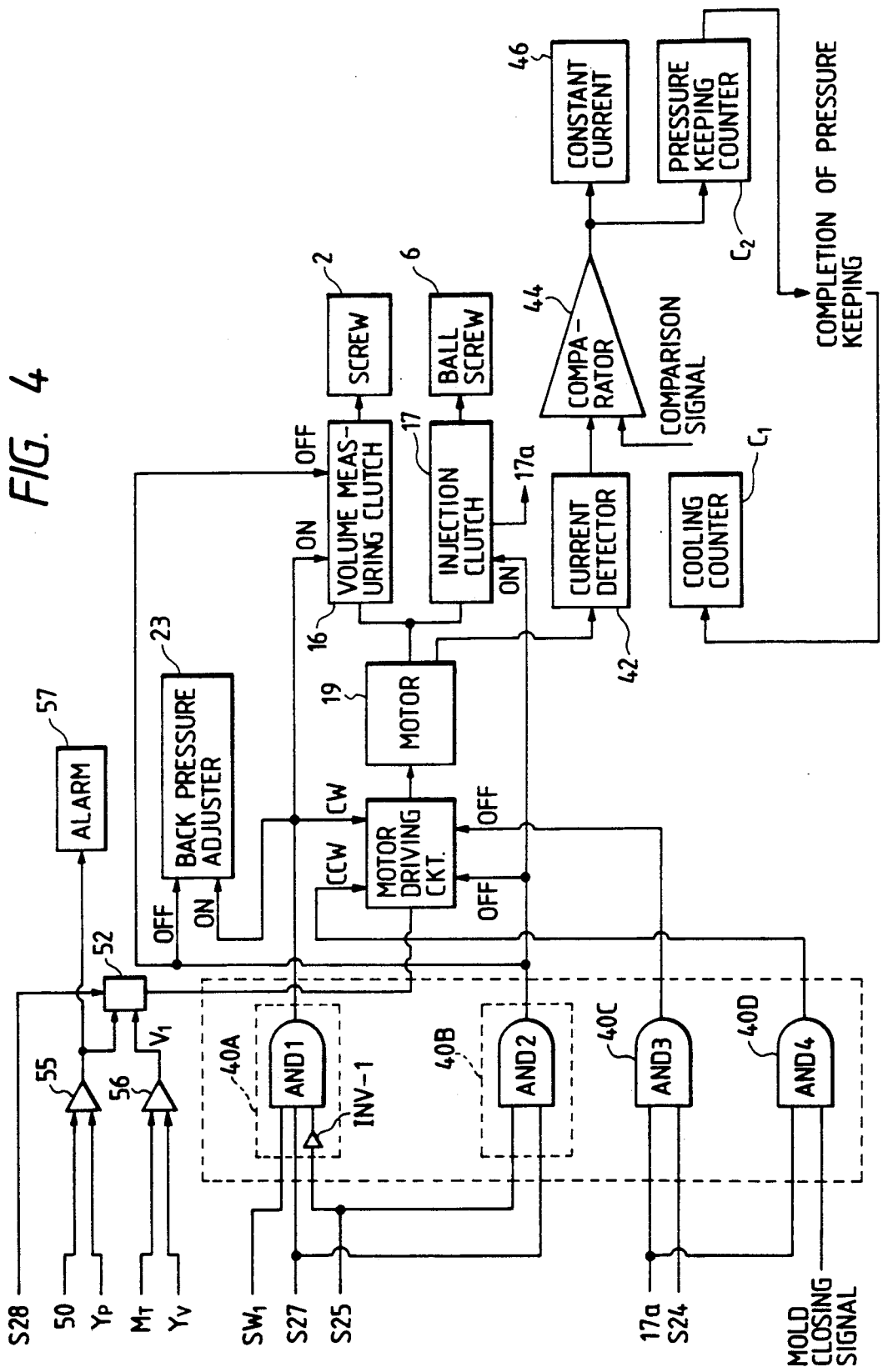
FIG. 4 is a block diagram of the first embodiment of the present invention.

To the lower end of the hollow ball bearing screw 6 is fixed a cylindrical hollow pressure detection sensor 50 through which the guide shaft 5 passes. The pressure sensor 50 is connected to the comparator 55, as shown in FIG. 4.

As stated above, the hollow ball bearing screw 6 is provided in such a manner as to be slidable along the guide shaft 5, and is moved up and down by the rotation of the ball nut 9. Since the upper end of the guide shaft 5 has the stopper plate 7 having a larger diameter than the hollow ball bearing screw 6 whereas the lower end thereof is fixed to the spline shaft 3 having a larger diameter than the hollow ball bearing screw 6, when the hollow ball bearing screw 6 moves up or down, it abuts against the stopper plate 7 or the spline shaft 3. Hence, since the stopper 7, the guide shaft 5, the spline shaft 3 and the screw 2 are fixed to each other, as stated above, when the hollow ball bearing screw 6 moves up or down and thereby abuts and presses presses against the stopper plate 7 or the spline shaft 3, which is achieved by the rotation of the ball nut 9 resulting from the rotation of the electrically driven motor 19, the screw 2 can move up or down within the heating cylinder 1.

The back pressure cylinder 22 is mounted on the injection unit base 21 (not shown). As stated above, the back pressure cylinder 22 is disposed on the same straight line as that on which the stopper plate 7, the guide shaft 5, the spline shaft 3 and the screw 2 are disposed to move the cylinder rod 33 up and down. As the cylinder rod 33 falls and presses against the stopper plate 7, a back pressure can be applied to the screw 2. A pressure adjuster 23 for the back pressure cylinder is connected through a tube 34 to the back pressure cylinder 22 and to a compressed fluid (air or the like) supply source which is not shown. The pressure applied by the back pressure cylinder 22 is controlled by controlling the pressure of the compressed fluid by means of the pressure adjuster 23.

The back pressure mechanism arranged in the manner described above is capable of applying a thrust to the screw 2 against the pressure generated in the molten molding material accumulated in front of the screw due to the volume measurement and mixture of the molding material and thereby preventing bubbles or the like from being generated in the molten molding material when no back pressure is applied. Also, the back pressure mechanism of this embodiment generates a back pressure by pushing out the cylinder rod 33 by means of the back pressure cylinder 22 and therefore has a simple configuration. The back pressure control source also has a simple structure, and can therefore be readily adjusted.

In the thrust bearing 35 provided at the lower end of the cylinder rod 33 and in contact with the stopper plate 7, two angular bearings 36 and 37 are provided symmetrically with respect to each other, as shown in FIG. 2C. Inner races of the bearings 36 and 37 are fixed by a shoulder portion of the cylinder rod 33 and a nut 38 threaded into the distal end of the cylinder rod 33, and outer races thereof are fixed by both a cylindrical member 40 having a shoulder portion 39 and a cylindrical member 42 having a protrusion 41. In consequence, when the cylinder rod 33 makes contact with the stopper plate 7, the cylindrical members 40 and 42 rotate and the cylinder rod 33 does not rotate due to the presence of the bearings 36 and 37. Reference numerals 24, 25, 26, 27 and 28 respectively denote a suck back completion detection sensor, a volume measurement completion detection sensor, a screw overrun detection sensor, a hollow ball bearing screw wait position sensor, and a screw stroke detection sensor for detecting the stroke of the screw 2, which will be described in detail later. The detection position of these sensors 24, 25, 26, 27 and 28 can be adjusted by moving the sensors relative to the injection unit base 21.

In this embodiment, the sensors 24, 25, 26, 27 and 28 are reflection type photo sensors. The suck back completion detection sensor 24 and the volume measurement completion detection sensor 25 use the side surface of the stopper plate 7 as a sensor dog. The hollow ball bearing screw wait position sensor employs the side surface of the hollow ball bearing screw 6 as a sensor dog. These sensors are designed to turn on when the stopper plate or the hollow ball bearing screw has moved to the position illuminated by the light output from the respective sensors. The screw overrun detection sensor 26 employs the side surface of the hollow ball bearing screw 6 as the sensor dog, and is designed to turn on when the hollow ball bearing screw has moved to the position which is not illuminated by the light output from the sensor.

In this embodiment, a dwell timer and a cooling timer are provided in the control unit 30 to measure the dwell time and the cooling time of the molded article placed within the mold cavity.

The operation of the electrically driven injecting apparatus arranged in the manner described above will now be described with reference to FIGS. 3A to 3E, FIG. 4 and FIG. 5. The numbers in parentheses in the following description correspond to the steps in the flowchart of FIG. 5.

i) Volume measurement and mixture mode

FIG. 3A shows a state in which the hollow ball bearing screw 6 is located at a position where it turns on the hollow ball bearing screw wait position sensor 27 and in which the back pressure cylinder 22 and the volume measurement clutch 16 are on (step S1). At that time, the signal output from a first logical means 40A is input to a motor drive means 19A to rotate the motor 19 clockwise (step S2).

The first logical means consists of an AND circuit 1 which receives at its input terminals a signal from the volume measurement and mixture detection sensor 25, a signal from the ball bearing screw wait position detection sensor 27 and a signal from an operation switch SW1 which indicates that the apparatus is operating, and an inverter (NOT) circuit INV-1 which receives the signal from the volume measurement sensor 25.

That is, when the ball bearing screw wait position detection sensor 27 is on, the volume measurement sensor 25 is off, and the switch SW1 is on, the logical means 40A outputs to the motor driving circuit 19A a signal which rotates the motor 19 clockwise, as shown in FIG. 3A. The signal output from the logical means 40A also turns on the volume measurement and mixture clutch 16 which transmits the rotational force of the motor 19 to the spline shaft 3 through the belt 12. Furthermore, the signal which is output from the logical means 40A turns on the pressure adjuster 23. Thus, the motor 19 is rotated clockwise (CW: clockwise) (step S2), and the screw 2 is thereby rotated by the motor 19 through the timing belt 12, the spline nut 8 and the spline shaft 3 and rises within the heating cylinder 22 while measuring and mixing the molding material supplied into the heating cylinder 1. Concurrently with this, a back pressure is applied to the screw 2 through the stopper plate 7, the guide shaft 5 and the spline shaft 3 by the back pressure cylinder 22.

ii) Volume measurement and mixture completion mode

When the screw 2 moves up to the state shown in FIG. 3B, an ON signal is output from the volume measurement completion detection sensor 25 (step S3).

When an ON signal from the volume measurement completion detection sensor 25 and that from the ball bearing screw wait position detection sensor 27 are input to a second logical means 40B, the second logical means 40B outputs a signal which deenergizes the motor driving means 19A and thereby stops the motor 19 (step S4).

Also, the signal which is output from the second logical means 40B disengages the volume measurement clutch 16 and turns off the pressure adjuster to release the back pressure, by which the volume measurement and mixture mode is completed (step S5).

While the volume measurement and mixture of the molding material are being conducted within the cylinder 1, the molding material which has been subjected to the volume measurement and mixture in the preceding step is charged into the dies (not shown) provided below the cylinder 1 where it is cooled and the cooled molded article is taken out. It is thus necessary to conduct suck back in order to prevent the molding material which has been mixed within the cylinder 1 from being leaked from the injection port of the cylinder 1.

iii) Suck back mode

After the motor 19 has been stopped and the back pressure has been released in step S5, the injection clutch 17 is engaged by the signal output from the second logical means 40B to couple the motor 19 with the ball bearing screw 6 through the ball nut 9 (step S6).

When a signal 17a which represents that the injection clutch 17 has been engaged is output, the motor driving means 19A outputs a signal which rotates the motor 19 clockwise (step S7), by which the hollow ball bearing screw 6 is moved up through the timing belt 13 and the ball nut 9 to push up the stopper plate 7 for the suck back. Suck back process continues until the hollow ball bearing screw 6 rises up to the position where it turns on the sack back completion detection sensor 24 (step S8), as shown in FIG. 3C. When the ON signal of the suck back completion detection sensor 24 and the signal 17a which represents that the injection clutch 17 has been engaged are input to a third logical means 40c, the third logical means 40c outputs a signal to the motor driving means 19A to stop the motor 19. Stoppage of the motor 19 (step S9) completes the suck back process. In FIG. 3C, a represents the suck back stroke, and b denotes the stroke through which the hollow ball bearing screw moves in the suck back process.

After the suck back process has been completed, counting by the cooling counter C1 is completed (step S10). When a signal C1 which represents that counting by the cooling counter C1 has been completed is output, a mold clamping means (not shown) is released to unclamp the mold (step S11). The mold is then opened (step S12). After the molded article is taken out (step S13), the mold is closed again (step S14) and is then clamped (step S15).

(iv) Injection mode

The mixed molding material is injected into the clamped mold. This injection is conducted by rotating the motor 19 and thereby pushing down the hollow ball bearing screw 6. That is, when the clamping signal of the mold clamping means (not shown) and the signal 17a representing that the injection clutch 17 is engaged are input to a fourth logical means 40D, the fourth logical means 40D outputs a signal to rotate the motor 19 counterclockwise (CCW) (step S16). At that time, since the injection clutch 17 is on, rotation of the motor 19 counterclockwise gives a downward thrust to the hollow ball bearing screw 6. The hollow ball bearing screw 6 first moves downward until the lower end thereof is brought into contact with a shoulder 3a of the spline shaft, as shown in FIG. 3D, and then pushes the screw 2 downward, by which the molding material is injected into the mold. During the injection process, the back pressure cylinder 22 is off, and the cylinder rod 33 remains at the position shown in FIG. 3C.

v) Switch-over of the motor control

A speed V1 which assures an injection rate of, for example, 5 cc/s is preset in the speed presetting means YV beforehand. When this preset speed V1 and the rotational speed V2 of the motor 19, which is detected by the tacho generator MT, are input to the speed comparison means 56, the speed comparison means 56 outputs an instruction SV obtained by the comparison. The motor speed control is performed during the injection process (step S17) by determining the voltage v, which is fed from the motor driving unit to the motor 19 through a switch-over unit 52, on the basis of the instruction SV such that the motor rotational speed coincides with the preset speed V1. The molten resin material accommodated within the cylinder 1 is packed into the cavity by the rotation and advance of the screw 2 which is achieved by the drive of the motor 19.

During the injection in which speed control is conducted, as the amount of molding material packed into the mold cavity increases, the pressure of the molding material increases. Therefore, the amount of current supplied to the motor 19 must be increased in order to maintain the above-described fixed injection speed. In this embodiment, when the screw 2 has been moved through a certain distance, the speed control is hence switched over to the pressure control. The distance through which the screw 2 has been moved is detected by means of the screw stroke detection sensor 28.

The screw stroke detecting sensor 28 includes a switch which is provided on the upper end portion of the screw 2 located outside of the cylinder 1, and outputs a signal to the switch-over unit 52.

Pressure control

When the screw stroke detection sensor 28 outputs a detection signal Ss, i.e., when it is determined by the ON signal of the screw stroke detection sensor 28 (step S18) that the preset packing rate (e.g., 90%) has been reached (indicated by SP in FIG. 6), control of the motor 19 is switched over from the speed control to the pressure control (step S19). However, if it is determined by the pressure comparison means 55 that the pressure obtained by the pressure sensor 50 exceeds the presed value while the speed control is being conducted, the process goes to step S21 without the control of the motor 19 being switched over from the speed control to the pressure control, and the motor 19 is stopped. At that time, the operator is informed by an alarm means 57 of the possibility that foreign matter may be present in the runner of the mold or that the molding material may be packed into the cavity of the mold without being mixed sufficiently. After the anomaly has been removed, subsequent injection is conducted.

If no anomaly is detected in the injection pressure, control of the motor 19 is switched over from the speed control to the pressure control (step S19), as stated above. Pressure control is conducted by comparing by means of the pressure comparison means 55 the pressure value P1 preset in the pressure presetting means YP shown in FIG. 2 with the screw injection pressure P2 detected by the pressure sensor 50 and by determining the current i sent to the motor 19 on the basis of the injection SP obtained by the comparison such that the injection pressure P2 coincides with the preset pressure P1. After the remaining injection (e.g., 10%) has been conducted and the preset pressure value P1 has been obtained (step S19'), counting by the dwell timer starts (step S19"), by which the injection process is completed and the dwell process starts. During the dwell process, the motor pressure control is continued and a fixed pressure is thereby kept applied to the molding material.

Once counting by the dwell timer has been completed (step S20), the motor 19 stops and the dwell process is thereby completed. Thereafter, counting by the cooling timer starts (step S21).

Once the dwell process has been completed, the motor 19 is rotated clockwise while the injection clutch 17 is maintained in an ON state for a subsequent volume measurement and mixture process (step S22). The hollow ball bearing screw 6 is raised to a position where it turns on the hollow ball bearing screw wait position sensor 27. When the hollow ball bearing screw wait position sensor 27 is turned on (step S23), the motor 19 is stopped (step S24), and the hollow ball bearing screw is located at the wait position, as shown in FIG. 3E. At that time, the injection clutch 17 is turned off (step S25). In FIG. 3E, e denotes the stroke of the hollow ball bearing screw.

Thereafter, the above-described processes are repeated by turning on the volume measuring clutch 16 and the back pressure cylinder (step S1) to conduct mixture, volume measurement, back pressure, suck back and injection.

Figure 6:
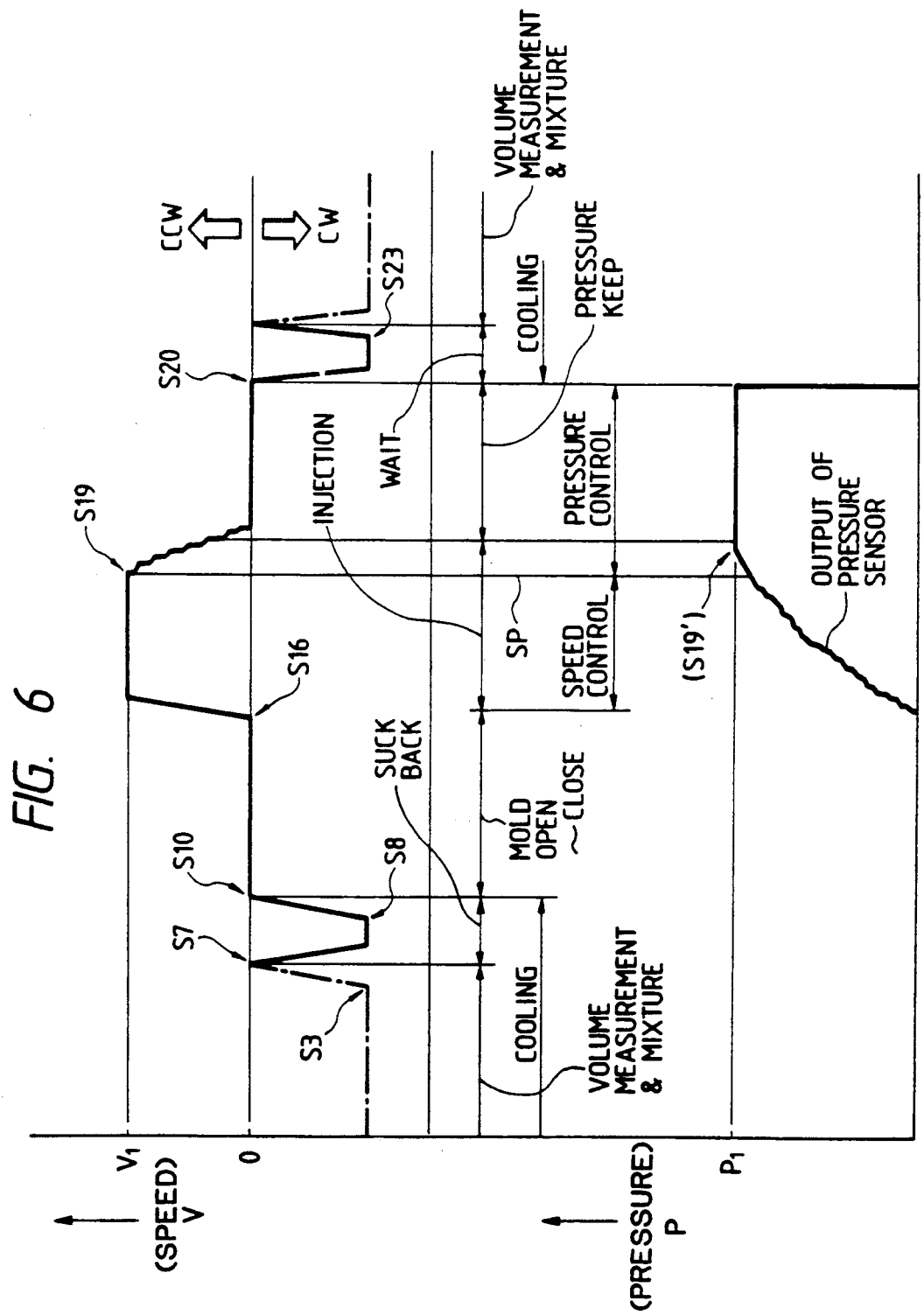
FIG. 6 shows the relation between the rotational speed control and the pressure control of a motor.

Speed control and pressure control of the motor 19 will now be described in detail with reference to FIG. 6.

The axis of abscissa represents the steps shown in the flowchart. In the volume measurement and mixture process, the volume measuring clutch is engaged, and the motor 19 is rotated at the fixed speed clockwise (CW) (steps S1 to S3). At that time, the back pressure cylinder 22 is turned on to apply a fixed back pressure to the screw 2 which retracts upward for the measurement. Once the volume measurement detection sensor 25 has been turned on (step S3), the motor 19 is stopped (step S4), and the volume measurement clutch 16 and the back pressure cylinder 22 are turned off. Next, the injection clutch 17 is engaged and the motor 19 is rotated clockwise (CW) to conduct suck back. Once the suck back completion detecting sensor 24 has been turned on (step S8), the motor 19 is stopped and the mold is opened and then closed (steps S10 to S16), Thereafter, the motor 19 is rotated counterclockwise (CCW) (step S16). In this injection process (steps S16 to S19), the motor speed is controlled such that it coincides with the preset value V1 which ensures the fixed injection rate until a packing rate of, for example, 90%, is obtained. Thereafter, pressure control is conducted in the remaining injection process and the subsequent dwell process. In FIG. 6, SP denotes the duration within which control of the motor is switched over from the speed control to the pressure control. Next, counting by the dwell timer is started (step S20), and the motor 19 is then turned off (step S21). Thereafter, the motor 19 is rotated clockwise (CW). When the wait position sensor 27 is turned on (step S23), the motor 19 is stopped (step S24), and the injection clutch 17 is disengaged for a subsequent mixture process.

As will be understood from the foregoing description, in the screw thrust control method for use in the injection molding apparatus according to the present invention, a cavity packing rate which ensures that the injection process is nearly completed is preset, and screw speed control is conducted until that preset packing rate is obtained in order to inject the molding material at the fixed injection rate. During the remaining injection process and the subsequent dwell process, the screw injection pressure is detected by the pressure detecting means and a desired screw thrust control is conducted on the basis of the detected pressure. In consequence, a desired screw thrust can be obtained in the dwell process, and a fixed injection rate can be achieved by conducting the screw speed control in the injection process. In the case of production of thin molded articles, it is possible to pack the cavity with the molding material densely and thereby manufacture products which has no sink and no defect in shape.

Furthermore, in the electrically driven injection apparatus of the type in which a screw accommodated in a heating cylinder is rotated and moved back and forth by an electrically driven motor, the rotation mechanism, the straight line motion mechanism, and the back pressure mechanism are disposed in that order at the rear end of the screw. The rotation mechanism includes a rotary shaft for rotating the screw, and a first rotating force transmitting mechanism for transmitting the rotational force of the motor to the rotary shaft. The straight line motion mechanism includes a guide shaft having engaging portions at the two ends thereof, a hollow ball bearing screw slidably fitted on the guide shaft and engaged with the engaging portions, a ball nut threadedly engaged with the hollow ball bearing screw, and a second rotational force transmitting mechanism for transmitting the rotational force of the motor to the ball nut. The operation of the pressure sensor is directly associated with the straight line motion of the hollow ball bearing screw of the straight line motion mechanism, and the pressure sensor is thus incorporated in the straight line motion mechanism of the screw. It is therefore possible to measure the pressure applied to the screw with a high degree of accuracy.

Figure 7:
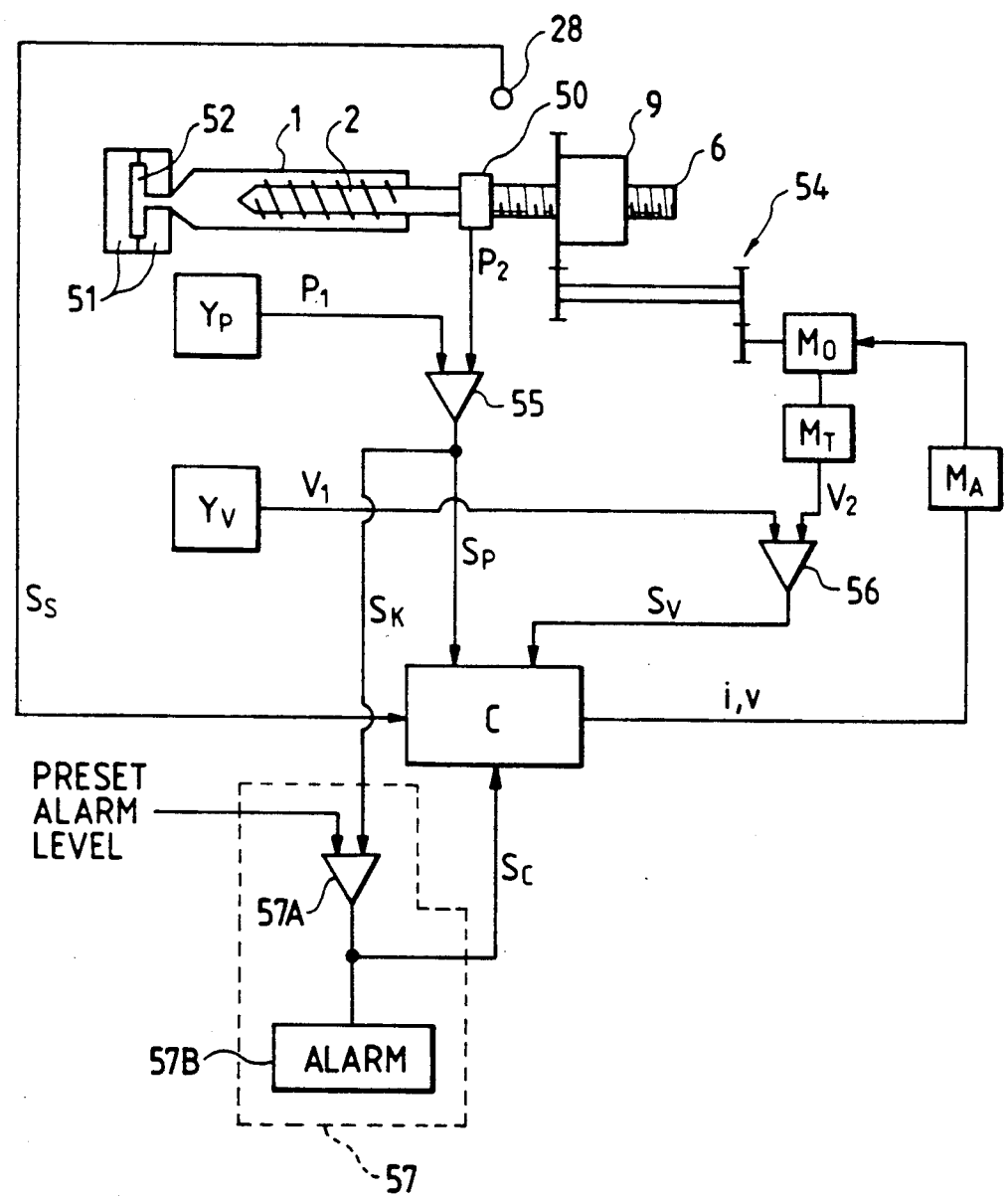
FIG. 7 shows a modification of the apparatus of FIG. 1.

FIG. 7 shows an example of the injection molding apparatus of the first embodiment with a safety device provided therewith, in which the signal output from the pressure comparison means 55 is utilized as the alarm information.

When pressure signal from the pressure sensor 50 is higher than the preset pressure value, the output signal of the comparison means 55 is input to the alarm circuit 57.

The alarm circuit 57 has a second pressure comparison means 57A, and the preset value of the second pressure comparison means 57A is set such that a signal is output from the comparison means 57A when the obtained pressure value exceeds the designed safety range.

The signal from the comparison means 55 is input to the second comparison means 57A and compared with the alarm preset value. When the output value of the pressure sensor 50 exceeds the safety threshold value, a signal Sc, representing anomaly in the pressure, is output from the second comparison means 57A to the motor control unit C and the subsequent operation is interrupted.

The signal Sc is also input to an alarm circuit 57B to issue an alarm.

In the flowchart shown in FIG. 5, the process of step S26 indicates that the flow goes to step S21 in which the motor is stopped when anomaly is found in the pressure detected by the pressure sensor 50 after the motor control has been switched over from the speed control to the pressure control.

In the above-described speed control, if it is determined by the pressure comparison means 55 that the pressure obtained by the pressure sensor 50 is higher than the preset value, the process goes to step S21 without the control of the motor 19 being switched over from the speed control to the pressure control, and the motor 19 is stopped. At that time, the operator is informed by an alarm means 57 of the possibility that foreign matter may be present in the runner of the mold or that the molding material may be packed into the cavity of the mold without being mixed sufficiently. After the anomaly has been removed, subsequent injection is conducted.

As stated above, according to the present invention, it is possible to detect anomaly which occurs during the injection process with a high degree of accuracy. This allows the operator to cancel the subsequent process and immediately begin maintenance work. As a result, molding time is not wasted and breakage of the die can be eliminated.

A second embodiment of the present invention will be described below with reference to FIGS. 8 to 13.

In this embodiment, a back pressure is accurately adjusted during the volume measurement and mixture process by using the pressure sensor.

In this back pressure adjusting method for use in an electrically driven injection molding apparatus of the type in which a screw accommodated in a heating cylinder is driven by a motor, the injection molding apparatus includes a screw for injecting a molding material into a mold cavity, a straight line motion means for driving the screw on a straight line, and a drive source for driving the straight line motion means. A detection means is provided on the straight line motion means for detecting the straight line pressure applied by the drive source, and the back pressure preset value from a back pressure presetting means is compared with the detected value of the detection means and the back pressure is adjusted on the basis of the comparison results.

Figure 8:
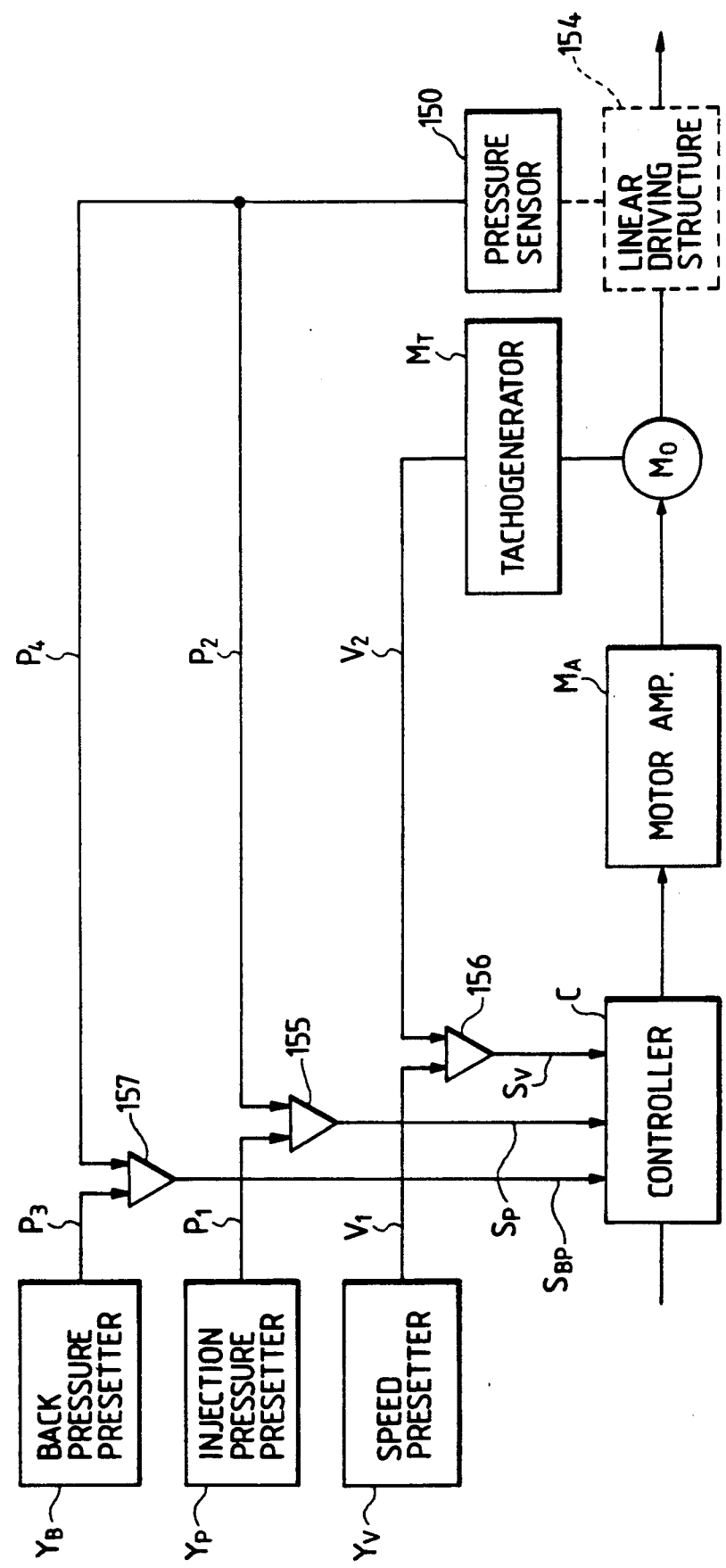
FIG. 8 is a schematic view of a second embodiment of the present invention.
Figure 9A:
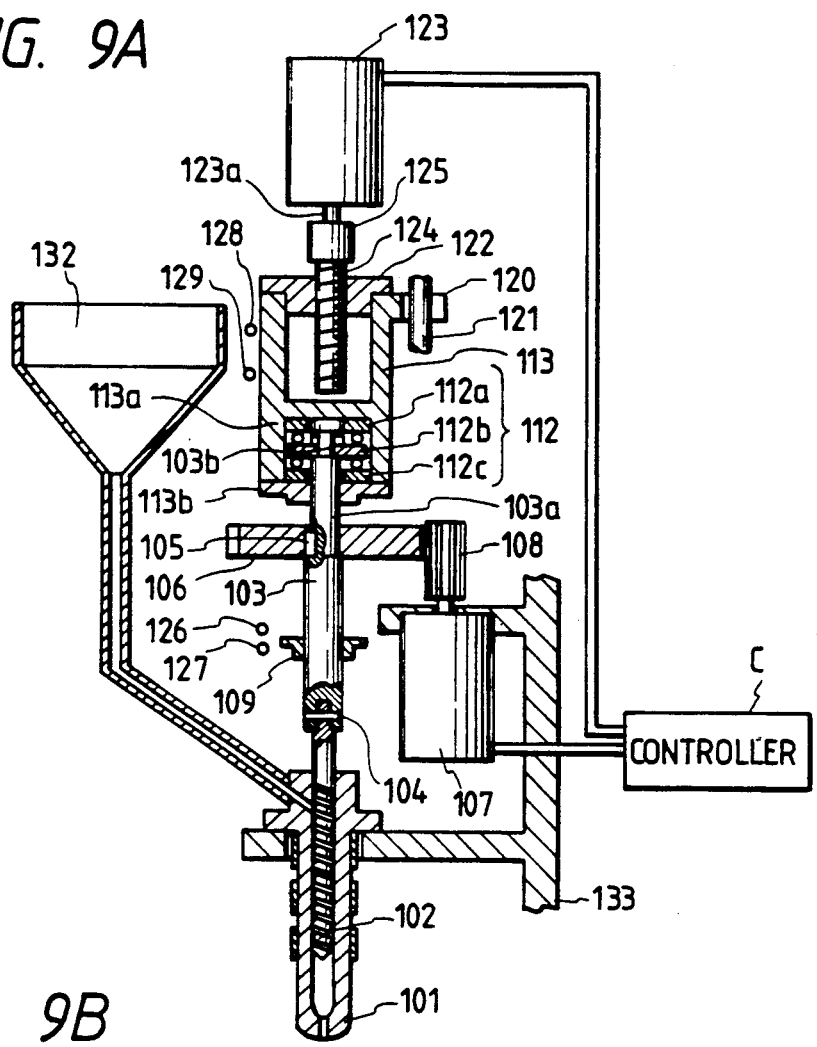
FIG. 9A is a schematic cross-sectional view of the second embodiment of the present invention.
Figure 9B:
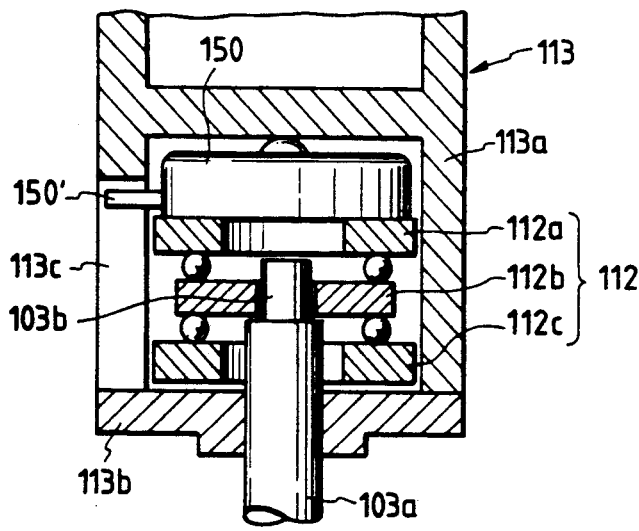
FIG. 9B is an enlarged view of the essential parts of the second embodiment of the present invention.
Figure 10:
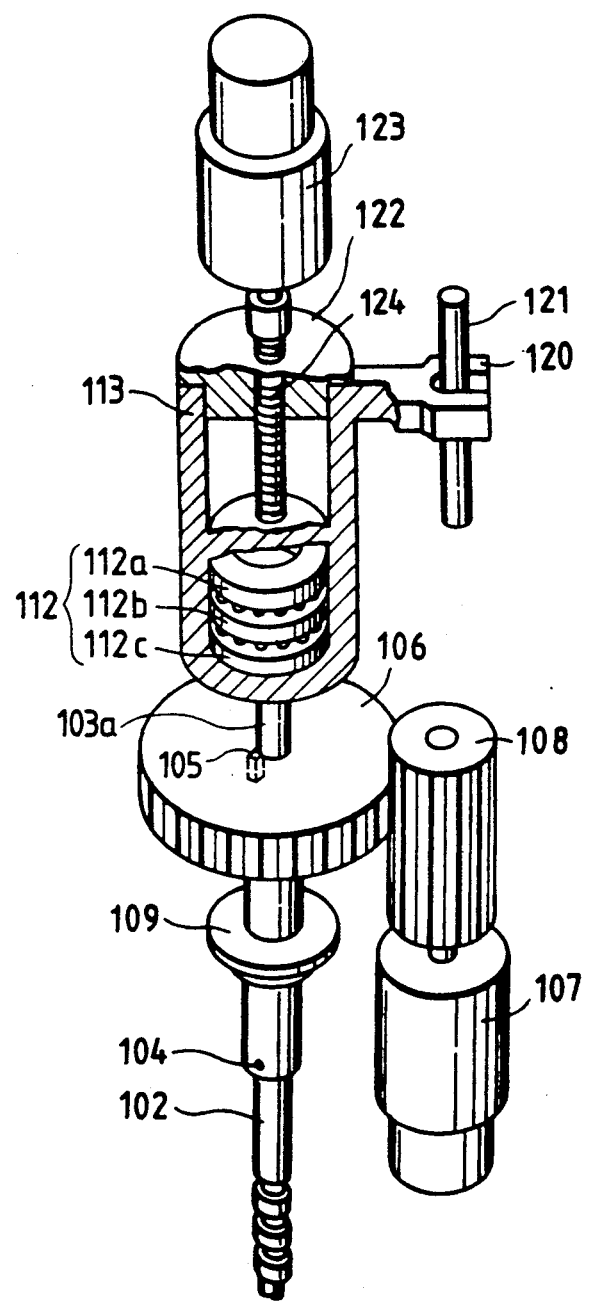
FIG. 10 is a perspective view of the vicinity of a rotation mechanism, straight line motion mechanism, a back pressure mechanism and an electrically driven motor of the apparatus of FIG. 9A.
Figure 13:
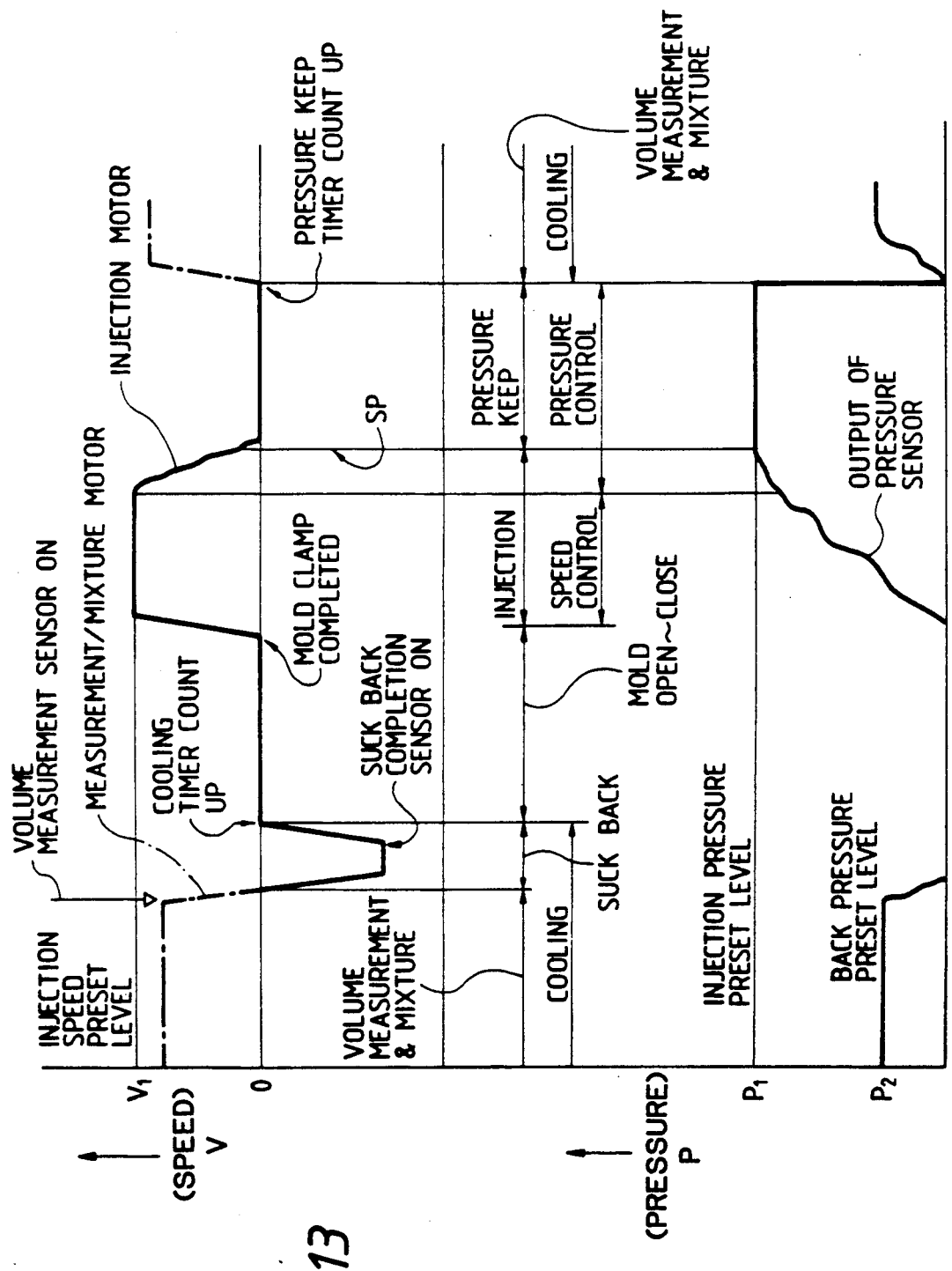
FIG. 13 shows the relation between the speed control and the pressure control of a volume measurement motor and an injection motor.
Figure 14:
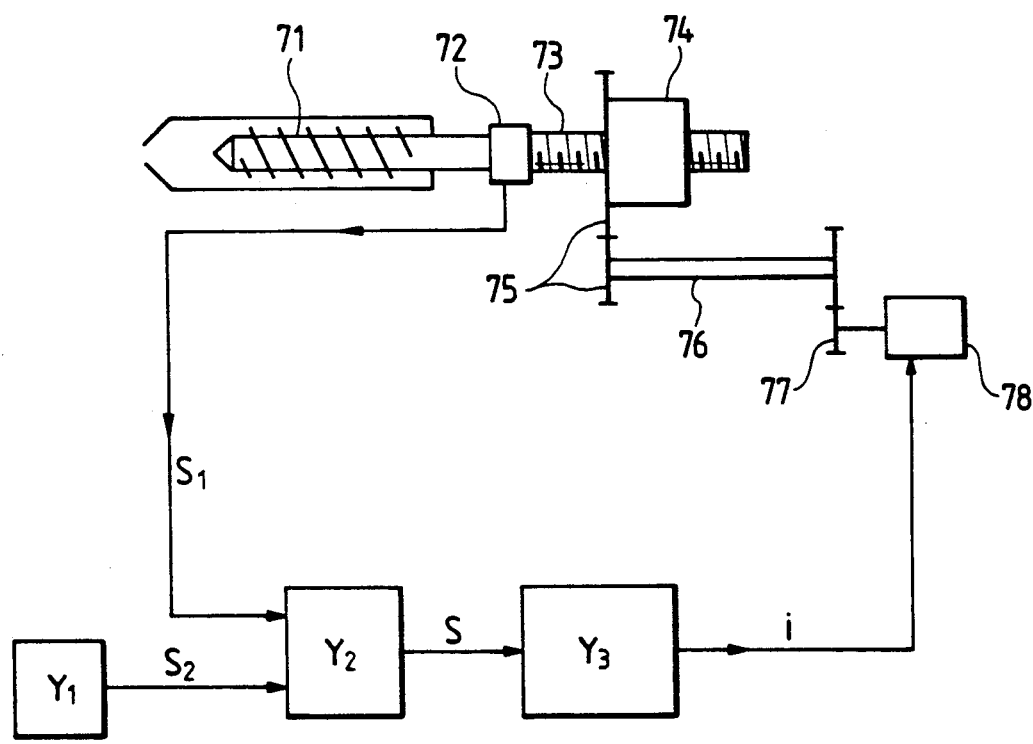
FIG. 14 shows a conventional electrically driven injection apparatus.

FIG. 8 is a schematic view of the second embodiment of the present invention, FIG. 9A is a schematic cross-sectional view of an electrically driven injection molding apparatus according to the present invention, FIG. 9B is an enlarged view of the apparatus of FIG. 9A, FIG. 10 is a perspective view of the vicinity of a rotation mechanism, a straight line motion mechanism, a back pressure mechanism and an electrically driven motor, FIGS. 11A to 11D explain the operation of the second embodiment of the present invention, FIG. 12 is a flowchart of the injection molding operation conducted by the second embodiment of the present invention, and FIG. 13 shows how currents supplied to a volume measurement and mixture motor and to an injection motor vary as the manufacturing process proceeds.

In FIG. 8, a straight line motion mechanism 154 is a mechanism which converts the rotational motion of an injection motor Mo (not shown in FIG. 8) into a straight line motion. An actual rotational speed V2 of the injection motor M0 is detected by a tacho generator MT connected to the injection motor M0. An injection pressure P2 is detected while the injection motor M0 is being driven by a pressure sensor 150 provided in the straight line motion mechanism 154.

During the injection process, the injection speed V1 which is preset in a speed setter Yv beforehand is sent to a speed comparison means 156 where it is compared with the motor rotational speed V2 detected by the tacho generator MT, and an instruction Sv corresponding to the comparison results is input to the motor control unit C. This motor speed control is changed over to the pressure control when the injection motor M0 has pushed out the screw toward a mold (not shown in FIG. 8) and the molding material has thereby been packed into the cavity of the mold at a predetermined packing rate.

Under the pressure control, a pressure value P1 which is preset in a pressure setting means YP beforehand is sent to a pressure comparison means 155 where it is compared with the screw injection pressure P2 detected by the pressure sensor 150, and an instruction SP corresponding to the comparison results is input to the motor control unit C.

A stroke detecting signal Ss for a screw 102 is detected by a screw stroke detecting sensor 128 provided on the side of the ball bearing screw. The detected signal Ss is sent to the motor control unit C. The molding material located in front of the screw 102 is packed into a cavity 152 as the screw 102 is driven by the motor Mo and thereby advances, during which the screw stroke detection signal Ss is kept input to the control unit C. Upon receipt of the signal Ss, the motor control unit C makes a determination as to whether the control performed in the unit C is based on the signal sent from the speed comparison means 156 or the signal sent from the pressure comparison means 155, and sends a current i resulting from the determination to the motor M0 through a motor amplifier MA.

The packing rate may be set on the basis of the relation between the stroke S0 of the screw 102 which is required to fill the cavity 152 with the molding material and which is measured beforehand and the actual stroke S1 of the screw 102. For example, if it is desired to detect the time the material has been packed at 90%, the screw stroke detection sensor 128 is provided at a position where it outputs a signal Ss when the screw 102 has moved to the position corresponding to 90% ($S1 = 0.9 \times S0$) of the previously obtained stroke S0 thereof. The detection signal Ss is used to determine as to whether or not the cavity 152 has been filled with the molding material at a packing rate of 90%. During the injection process, the voltage v, which is sent from the motor control unit C to the motor 119, is controlled on the basis of the instruction Sv sent from the speed comparison means 156 such that the motor rotational speed V2 coincides with the preset speed V1. When the sensor 128 outputs the detection signal Ss, i.e., when the packing rate reaches 90%, control of the motor is switched over from the speed control to the pressure control. Thereafter, the current i, which is sent from the motor control unit C to the motor 119, is controlled on the basis of the instruction SP sent from the pressure comparison means 155 such that the injection pressure P2 coincides with the preset pressure P1, and the remaining packing and dwell are then conducted on the basis of that current i.

In the above-described motor controlling method, since a fixed injection rate is achieved by the speed control which is conducted until the preset packing rate is obtained, even if the cavity is thin, it is possible to fill the molding material in every corner of the cavity and thereby produce molded articles which has no sink marks nor defect in shape. During the remaining injection process and the dwell process, pressure control is conducted and a desired pressure is obtained. This enables uniform molded articles having no variation in the dimensions or strength to be manufactured. The packing rate at which the control is switched over from the speed control to the pressure control can be altered by moving the position of the sensor 128 accordingly.

During the volume measurement and mixture process, the screw is rotated by the rotation of another motor for the volume measurement and mixture (not shown in FIG. 8) to mix the molten molding material in the heating cylinder (not shown in FIG. 8). As the amount of molten molding material accumulated in front of the screw increases, the screw retracts. At that time, application of a back pressure to the screw must be conducted in order to eliminate entry of bubbles or the like into the molten molding material accumulated in front of the screw.

The back pressure is applied to the screw by switching over the injection motor M0 to the back pressure mode and by applying a predetermined torque to this motor against the thrust with which the screw is retracted. Back pressure control is conducted when this predetermined torque is applied to the motor. In this back pressure control, the pressure value P3 which is preset in the back pressure setter YB is sent to a pressure comparison means 157 where it is compared with the actual screw injection pressure P4 detected by the pressure sensor 150, and an instruction SBP corresponding to the comparison results is input to the motor control unit C.

Next, the structure of the injection molding apparatus which incorporates the above-described control means will be described with reference to FIGS. 9A, 9B and FIG. 10.

The injection molding apparatus includes a screw 102 accommodated in a heating cylinder 101, a rotary shaft 103 fixed to the rear end portion of the screw 102 by means of a pin 104, the rotary shaft 103 having an intermediate portion 103a having a smaller diameter than the lower portion thereof, a driven spur gear 106 fixed to the intermediate portion 103a by means of a key 105, a straight line motion cylinder 113 located above the rotary shaft 103, and an injection motor 123 (corresponding to the above-described motor M0, which is hereinafter referred to as the injection motor). These components are disposed on the same straight line as that on which the screw 102 is disposed.

A molding material in a hopper 132 is supplied to the interior of the heating cylinder 101 by way of a pipe 131.

An electrically driven motor 107 for the volume measurement and mixture (hereinafter referred to as a volume measurement motor) for rotating a driving spur gear 108 engaged with the driven spur gear 106 is mounted on an injection unit base 133 on the side of the rotary shaft 103. The driving spur gear 108 has a width wide enough to keep it engaged with the driven spur gear 106 when the rotary shaft 103 is moved up or down.

In the above-described arrangement, during the volume measurement and mixture process, the rotary shaft 103 can be rotated by the volume measurement motor 107 through the driven spur gear 106 and the driving spur gear 108 to rotate the screw 102 accommodated in the cylinder 101 and thereby supply the molding material into the cylinder 101 while measuring the volume thereof and mixing the molding material.

The lower end portion of the straight line motion cylinder 113 forms a bearing chamber 113a to which races 112a and 112c of a thrust bearing 112 are fixed. The thrust bearing 112 is retained by a lid portion 113b which closes the lower opening of the straight line motion cylinder 113. An upper portion 103b of the rotary shaft 103 is fixed to a central race 112b of the thrust bearing 112. The pressure sensor 150 is provided in the bearing chamber 113a of the straight line motion cylinder 113 on the upper surface of the race 112a. The outer diameter of the races 112a and 112c is slightly smaller than the inner diameter of the bearing chamber 113a, and the height from the lower surface of the race 112c to the upper surface of the pressure sensor 150 is slightly smaller than the height of the bearing chamber 113a. In this way, the pressure sensor 150 and the thrust bearing 112 can be moved up and down as one unit through a very short distance relative to the bearing chamber 113a. The pressure sensor 150 has a horizontal pin 150', which is received by a groove 113c formed in the bearing chamber of the straight line motion cylinder 113 in the vertical direction, by which the pressure sensor 150 is prohibited from being rotated and is thereby allowed to detect upward or downward thrust which is applied to the screw in the thrust direction during the injection process and during the application of back pressure. A ball nut 122 is fixed to the upper end portion of the straight line motion cylinder 113, and a ball screw 124, which is connected to an output shaft 123a of the injection mode 123 provided above the straight line motion cylinder 113 through a coupling 125, engages with the ball nut 122. In this embodiment, radial bearing may also be employed. However, description and illustration thereof will be omitted.

The straight line motion cylinder 113 has on its side a protrusion 120 whose distal end is bifurcated and which has a through-hole that runs parallel to the axis of the screw 102. A guide shaft 121 fixed to the unit base 133 is inserted into the through-hole of the protrusion 120. Hence, the straight line motion cylinder 113 can move back and forth only in the axial direction of the screw 102 due to presence of the guide shaft 121.

Consequently, when the injection motor 123 rotates during the injection process, the straight line motion cylinder 113 can move up and down through the ball screw 124 and the ball nut 122 to advance and retract the screw 102 through the rotary shaft 103 accordingly.

A group of sensors provided in the injection molding apparatus includes a suck back completion detection sensor 126, a volume measurement completion detection sensor 127 for detecting the position of the screw 102 by means of a sensor dog 109 fixed to the middle of the rotary shaft 103, the screw stroke detection sensor 128 for detecting the stroke of the screw 102 by using the side surface of the straight line motion cylinder 113 as a sensor dog, and an overrun detection sensor 129 for detecting the vertical position of the screw 102 by using the side surface of the straight line motion cylinder 113 as a sensor dog. These sensors 126, 127, 128 and 129 are connected to a controller (not shown), and the signals are also sent from these sensors to the motor control unit C and used to control the injection motor 123 and the volume measurement motor 107.

This embodiment has a basic structure shown in FIG. 8. However, the pressure setter $Y_P$, the pressure comparator 155, the speed setter $Y_V$, the speed comparator 156, the back pressure setter $Y_3$, the pressure comparator 156 and the tacho generator $M_T$, shown in FIG. 8, are also incorporated in the apparatus shown in FIG. 9, so that the instructions $S_P$, $S_V$, $S_{BP}$ and the stroke of the screw 102 and so on obtained in the manner shown in FIG. 8 can be sent to the motor control unit C to control the current supplied to the injection motor 123.

The molding material located in front of the screw 102 is packed into the cavity of a mold (not shown) provided in front of the heating cylinder 101 by the screw 102 as the screw 102 is driven by the injection motor 123 and thereby advances, during which the screw stroke detection sensor 128 inputs the screw stroke detection signal to the control unit C. Upon receipt of the signal, the motor control unit C makes a determination as to whether the control performed in the unit C is based on the signal sent from the speed comparison means 156 or the signal sent from the pressure comparison means 155, and sends a current i resulting from the determination to the motor 123.

During the volume measurement and mixture process, application of a back pressure to the screw must be conducted in order to eliminate entry of bubbles or the like into the molten molding material accumulated in front of the screw 102 which rotates in the heating cylinder 101. In this embodiment, the back pressure is applied to the screw by switching over the injection motor 123 to the back pressure mode by means of the motor control unit C and by applying a predetermined torque to this motor against the thrust with which the screw 102 is retracted. In the back pressure control operation which is conducted to control the predetermined torque, the pressure value P3 which is preset in the back pressure setter $Y_B$ is sent to a pressure comparison means 157 where it is compared with the actual screw injection pressure P4 detected by the pressure sensor 150, and an instruction $S_{BP}$ corresponding to the comparison results is input to the motor control unit C.

Next, the operation of the electrically driven injection molding apparatus arranged in the manner described above will be described below with reference to FIGS. 11A to 11D and FIG. 12. The numbers in parentheses in the following description indicate the steps in the flowchart of FIG. 12.

FIG. 11A shows the volume measurement and mixture process. In this process, the volume measurement motor 107 rotates counterclockwise (CCW) (step S1) to rotate the screw 102 through the driving spur gear 108, the driven spur gear 106 and the rotary shaft 103 and thereby mix and melt the molding material supplied into the heating cylinder 101 from the hopper 132. As the amount of molten molding material accumulated in front of the screw 102 in the heating cylinder 1 increases, the screw 102 retracts further upward in the heating cylinder 101.

Also, the operation mode of the injection motor is switched over to the back pressure mode during the volume measurement and mixture process, and the injection motor 123 is rotated counterclockwise (CCW) to apply back pressure to the screw 102 through the ball screw 124, the ball nut 122, the straight line motion cylinder 113, the thrust bearing 112 and the rotary shaft 103. Back pressure control conducted at that time is a feed back control which is conducted such that the difference between the actual back pressure detected by the pressure sensor 150 and the preset injection pressure is zeroed.

Next, as shown in FIG. 11B, when the screw 102 is raised until it turns on the volume measurement completion detection sensor 127 (step S2), the injection motor 123 and the volume measurement motor 107 are stopped (steps S3 and S3'), thereby completing the volume measurement and mixture process. At that time, the injection motor 123 is switched over to the injection mode.

Thereafter, the injection motor 123 is rotated clockwise (CW) (step S4) to conduct the suck back process. The suck back process is conducted in order to prevent the molten molding material whose volume has been measured in step S4 from leaking from the injection outlet of the cylinder 101 when the mold is opened to take out the molded article.

As the injection motor 123 rotates clockwise (CW), the straight line motion cylinder 113 rises through the ball screw 124 and the ball nut 122. In FIG. 11C, "a" indicates the suck back stroke. When the screw 102 has moved through the stroke "a" and the suck back completion detection sensor 126 has thereby been turned on (step S5), the injection motor 123 is stopped (step S6), thereby completing the suck back process.

Next, in a mold (not shown) provided below the screw 102, a cooling timer generates a timeout signal (step S7), which indicates that cooling of the molded article is completed, and the mold is then unclamped (step S8). Thereafter, the mold is opened (step S9), and the molded article is taken out (step S10). The mold is closed again (step S11), and the mold is then clamped (step S12).

Subsequently, as shown in FIG. 11D, the injection motor 123 is rotated counterclockwise (CCW) (step S13) to impart a downward thrust to the straight line motion cylinder 113, to push the screw 102 downward through the rotary shaft 103 and thereby inject the molten molding material located in front of the screw 102 into the cavity of the mold. The controller 130 conducts speed control of the injection motor 123 (step S14). In this speed control operation of the motor conducted during the injection process, a speed V1 which assures an injection rate of, for example, 5 cc/s, is preset beforehand in the speed presetter Yv shown in FIG. 8. This preset speed V1 and the rotational speed V2 of the injection motor 123, detected by the tacho generator MT, are input to the speed comparator 156, and the voltage supplied to the injection motor 123 from the motor control unit C is determined on the basis of the instruction Sv obtained by the comparison by means of the speed comparator 156 such that the motor rotational speed V2 coincides with the preset speed V1. As stated above, when the screw stroke detection sensor 128 outputs a detection signal, i.e., when it is determined by the ON signal of the screw stroke detection sensor 128 (step S15) that the preset packing rate (e.g., 90%) has been reached (indicated by SP in FIG. 13), control of the injection motor 123 is switched over from the speed control to the pressure control (step S16). In this pressure control, the pressure P1 preset in the pressure setter YP is sent to the pressure comparator 155 where it is compared with the injection pressure P2 of the screw 102 detected by the pressure sensor 150, and the current i supplied from the motor control unit C to the injection motor 123 is determined on the basis of the instruction SP obtained by the comparison such that the injection pressure P2 coincides with the preset pressure P1. The remaining injection (e.g., 10%) is thus conducted. When the preset pressure P1 is reached (step S16'), counting by the dwell timer is started (step S16"), by which the injection process is completed and the dwell process starts in which pressure control of the motor is continued to apply a fixed pressure to the molding material.

Next, when the dwell timer generates a timeout signal (step S17), the injection motor 123 is stopped, by which the dwell process is completed and counting by the cooling timer is started (step S18).

Thereafter, the injection motor 123 is rotated clockwise (CW) and thereby returned to the wait position where it is located for volume measurement and mixture. When the wait position sensor is turned on (step S20), the injection motor 123 is turned off (step S21). Thereafter, the processes from steps S1 to S21 are repeated for a further injection.

Switch-over between the volume measurement motor 107 and the injection motor 123 and the speed and pressure controls of the injection motor 123 will be described below with reference to FIG. 13.

The axis of abscissa represents the processes in the flowchart of FIG. 12. In the volume measurement and mixture process, the volume measurement motor 107 rotates counterclockwise (CCW) and the injection motor 123 is switched over to the back pressure mode and rotates counterclockwise (CCW). In consequence, the screw 102 is rotated and the molding material is thereby mixed while a fixed current which assures a fixed torque is supplied to the injection motor 123 and a fixed back pressure is thereby applied to the screw 102 which retracts upward due to the presence of the molding material (steps S1, S1' and S"). Next, the volume measurement completion sensor turns on, and the injection motor 123 and the volume measurement motor 107 stop (steps S2 to S3'), and suck back (steps S4 and S5) is then conducted in which the injection motor 123 is rotated clockwise (CW) and control of the injection motor is switched over to the injection mode (step S4). Thereafter, counting by the cooling timer is completed (step S7), and the mold is opened and then closed (steps S8 to S12). In the subsequent injection process (steps S13 to S17), speed control of the injection motor 123 is first conducted and the motor 123 is thereby rotated at the fixed preset value V1 (steps S13 to S15) until the cabity of the mold has been packed with the molding material at a packing rate of, for example, 90%. In the remaining injection process and the dwell process, however, pressure control is conducted and the preset value P1 is maintained (steps S16 to S17). In FIG. 13, "SP" denotes the duration within which control of the injection motor 123 is switched over from the speed control to the pressure control. Next, counting by the dwell timer ends (step S17), and the injection motor 123 stops (step S18). Thereafter, the injection motor 123 rotates clockwise (CW) (step S19), and the screw 102 is thereby returned to the wait position where it turns on the wait position sensor (step S20). The injection motor then stops (step S21). Subsequently, the volume measurement and mixture process begins again.

In this embodiment, the back pressure is detected during the volume measurement and mixture process by using the pressure sensor which detects an actual injection pressure, and the back pressure detected by the pressure sensor is compared with the preset back pressure value and then fed back in such a manner that the difference between these two values zeroes. In consequence, a fixed back pressure can be applied.

As will be clear from the foregoing description, the back pressure adjusting means of the electrically driven injection molding apparatus according to the present invention is capable of accurately applying a preset back pressure to the screw which retracts during the volume measurement and mixture process. Furthermore, the back pressure application means also serves as the injection motor and the injection pressure detection means. This makes the overall molding apparatus compact and inexpensive.

What is claimed is:

1. An injection molding method which is a screw thrust control method for an injection molding apparatus in which thrust of a screw is dependent on a motor; the improvement being characterized in that a pressure detection means for detecting an injection pressure of the screw and a means for detecting a stroke of said screw are provided, and in that speed control is first conducted until a present packing rate which represents that a dwell process is almost started is reached and the remaining injection process and a subsequent dwell process are conducted using an output of said pressure detection means.

2. An injection molding method according to claim 1, wherein said speed control is conducted by comparing a rotational speed of said motor with a preset speed and by controlling said motor such that it rotates at a speed corresponding to said preset speed, and wherein the output of said pressure detection means is compared with a preset pressure and said motor is controlled such that said screw thrust is maintained to said preset pressure.

* * * * *

UNITED STATES PATENT AND TRADEMARK OFFICE
CERTIFICATE OF CORRECTION

PATENT NO. : 5,102,587          Page 1 of 3

DATED : April 7, 1992

INVENTOR(S) : MASAAKI KUMAMURA ET AL.

It is certified that error appears in the above-identified patent and that said Letters Patent is hereby corrected as shown below:

On the title page: Item

AT [30] FOREIGN APPLICATION PRIORITY DATA insert, --[30] Foreign Application Priority Data,
            Jul. 26, 1989  [JP]  Japan ...... 1-191377
            Jul. 26, 1989  [JP]  Japan ...... 1-191378
            Jul. 27, 1989  [JP]  Japan ...... 1-192758
            Jul.  3, 1990  [JP]  Japan ...... 2-176991--.

COLUMN 2

Line 9, "coincided" should read --to coincide--.

COLUMN 4

Line 63, "has" should read --have--.

COLUMN 5

Line 34, "is" should read --are--.

COLUMN 6

Line 14, "presses presses" should read --presses--.

COLUMN 8

Line 47, "means 40c," should read --means 40C,--.
    Line 48, "means 40c" should read --means 40C--.
    Line 63, "(iv) should read --iv)--.

UNITED STATES PATENT AND TRADEMARK OFFICE
CERTIFICATE OF CORRECTION

PATENT NO. : 5,102,587
DATED : April 7, 1992
INVENTOR(S) : MASAAKI KUMAMURA ET AL.

It is certified that error appears in the above-identified patent and that said Letters Patent is hereby corrected as shown below:

COLUMN 9

Line 60, "presed" should read --preset--.

COLUMN 11

Line 5, "clockwise (CW)." should read --clockwise (CW) (step S22).--.
Line 27, "has" should read --have--.

COLUMN 14

Line 9, "has" should read --have--.
Line 58, "switch" should read --which--.

COLUMN 15

Line 40, "injection mode 123" should read --injection motor 123--.
Line 43, "bearing" should read --bearings--.

COLUMN 17

Line 4, "feed back" should read --feedback--.

COLUMN 18

Line 38, "S")." should read ----S1").--.
Line 51, "cabity" should read --cavity--.

UNITED STATES PATENT AND TRADEMARK OFFICE
CERTIFICATE OF CORRECTION

PATENT NO. : 5,102,587
DATED : April 7, 1992
INVENTOR(S) : MASAAKI KUMAMURA ET AL.

It is certified that error appears in the above-identified patent and that said Letters Patent is hereby corrected as shown below:

COLUMN 20

Line 5, "present" should read --preset--.

Signed and Sealed this

Twenty-eighth Day of December, 1993

Attest:

BRUCE LEHMAN

Attesting Officer        Commissioner of Patents and Trademarks